(12) United States Patent
Awano et al.

(10) Patent No.: US 8,272,119 B2
(45) Date of Patent: Sep. 25, 2012

(54) METHOD OF FORMING COIL ASSEMBLY FOR STATOR

(75) Inventors: Shinichi Awano, Kiyosu (JP); Yoshiteru Kashihara, Yamagata (JP); Takuji Harada, Hekinan (JP); Yoshinobu Yanagisawa, Toyota (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 12/620,948

(22) Filed: Nov. 18, 2009

(65) Prior Publication Data
US 2010/0125999 A1    May 27, 2010

(30) Foreign Application Priority Data
Nov. 21, 2008   (JP) .................................. 2008-298416

(51) Int. Cl.
*H02K 15/04* (2006.01)
(52) U.S. Cl. .......................................... 29/605; 29/596
(58) Field of Classification Search ............. 29/596, 29/598, 605
See application file for complete search history.

(56) References Cited

U.S. PATENT DOCUMENTS

| 7,143,501 | B2 | 12/2006 | Bramson et al. |
| 2004/0040142 | A1 | 3/2004 | Hirota et al. |
| 2006/0005376 | A1 | 1/2006 | Hirota et al. |
| 2006/0230603 | A1* | 10/2006 | Hirota et al. ............ 29/605 |

FOREIGN PATENT DOCUMENTS

| JP | 2004-104841 | 4/2004 |
| WO | WO 2008/108351 | 9/2008 |

* cited by examiner

*Primary Examiner* — Livius R Cazan
(74) *Attorney, Agent, or Firm* — Nixon & Vanderhye PC

(57) ABSTRACT

The method of manufacturing a coil assembly for a stator formed with slots includes a coil wire combination forming step of forming a band-like coil wire combination by overlapping a plurality of coil wires while forming them with in-slot portions to be accommodated in the slots and turn portions each connecting each adjacent two of the in-slot portions, and a shaping step of shaping the band-like coil wire combination into a cylindrical shape by helically winding the band-like coil wire combination. The coil wire combination forming step is carried out by performing an interlaced part forming step of forming an interlaced part by overlapping the coil wires with each adjacent two of the coil wires intersecting with each other and a non-interlace part forming step of forming an interlaced part by overlapping the coil wires with each adjacent two of the coil wires not intersecting with each other.

7 Claims, 32 Drawing Sheets

FIG.11
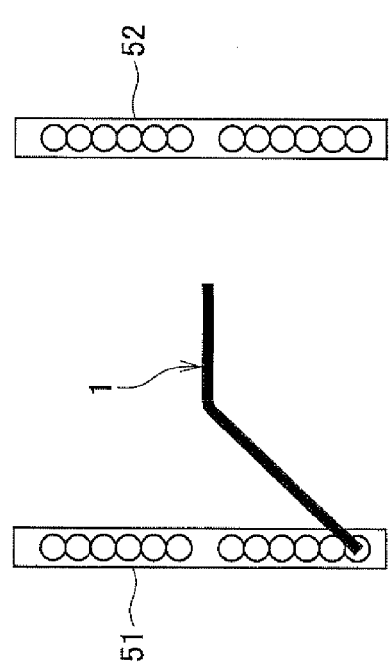
(A) VIEW FROM ARROW A
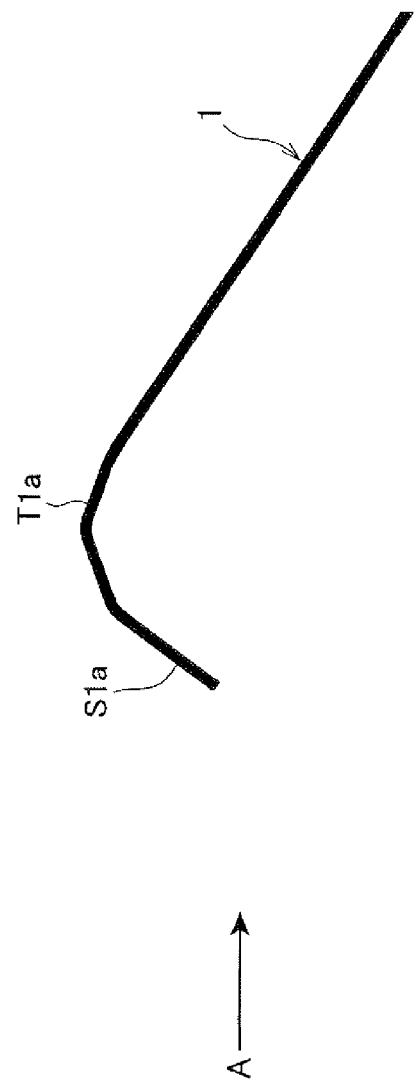
(B)

FIG.12
(A) 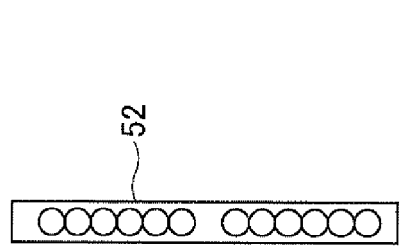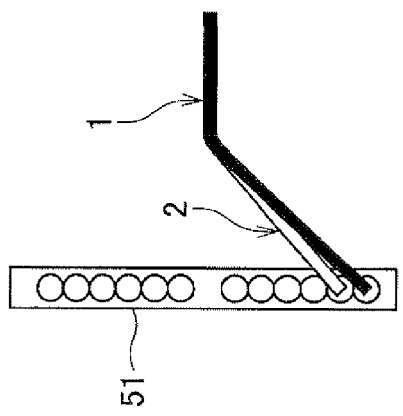
(B) 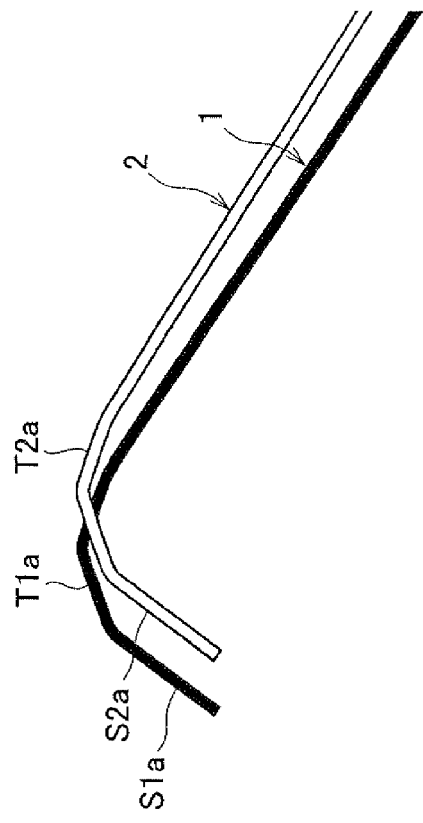

FIG.13
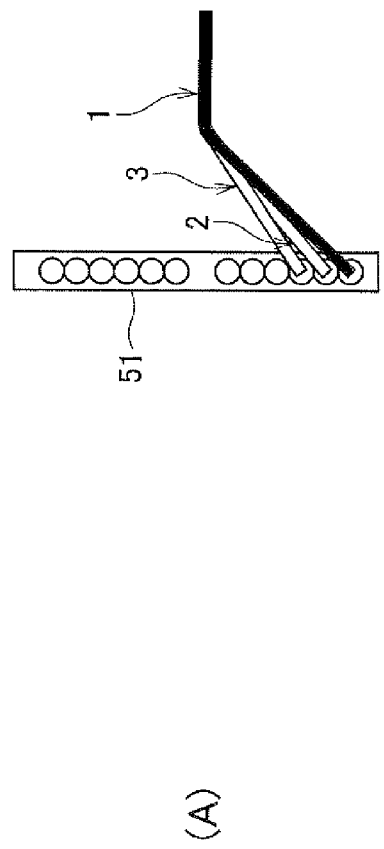
(A)
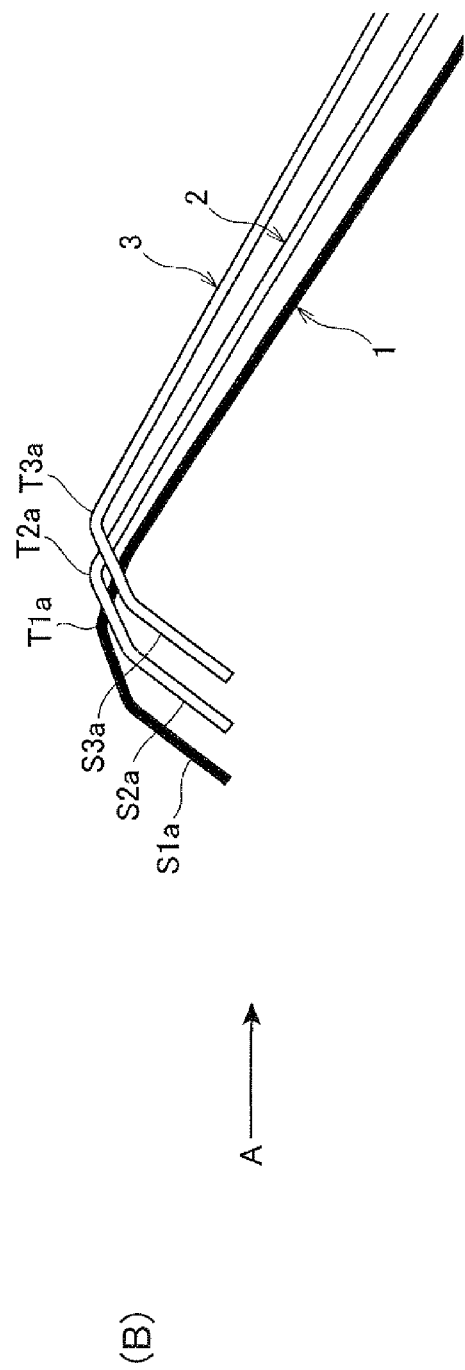
(B)

FIG.14
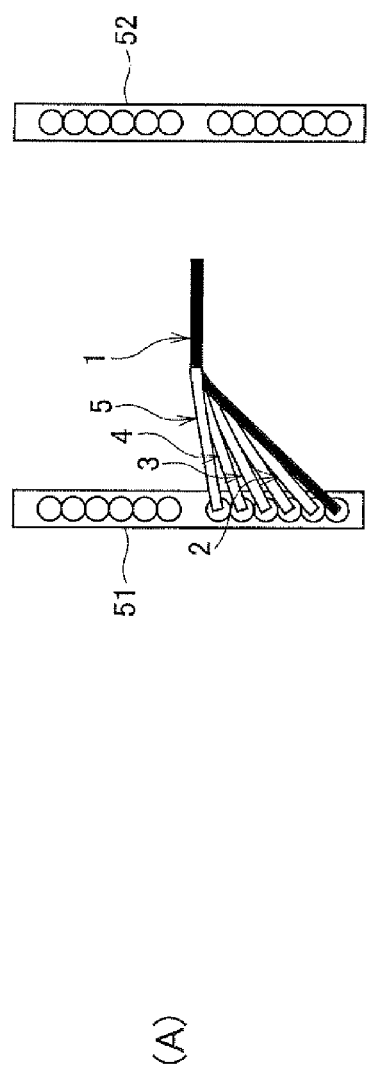
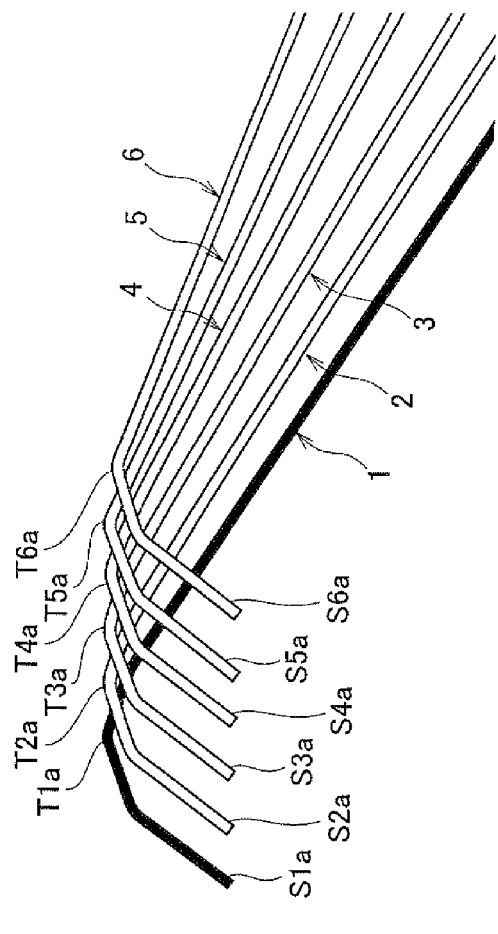

FIG.17
(A)
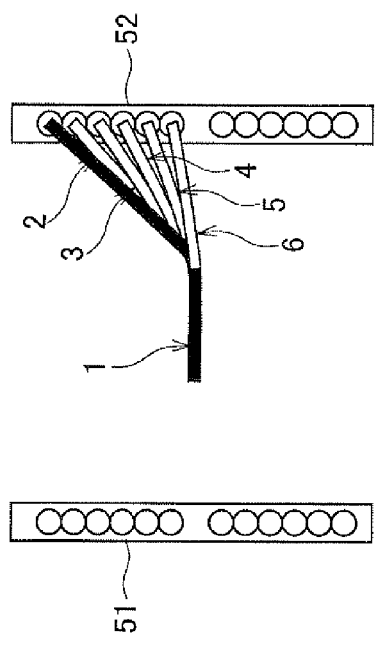
VIEW FROM ARROW A
(B)
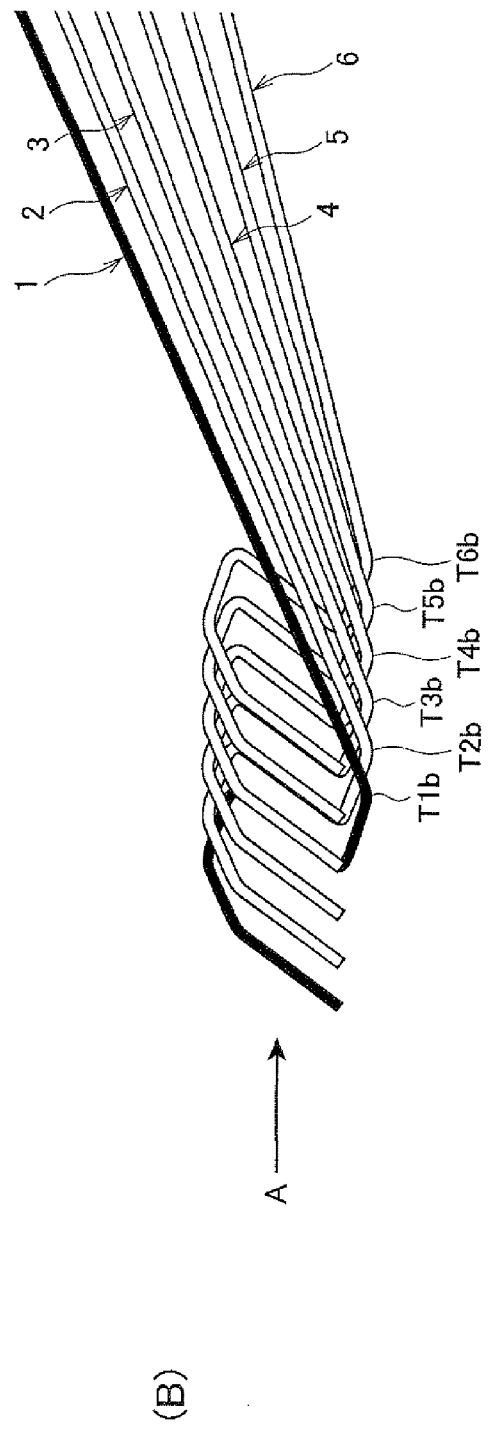

FIG. 18
(A)
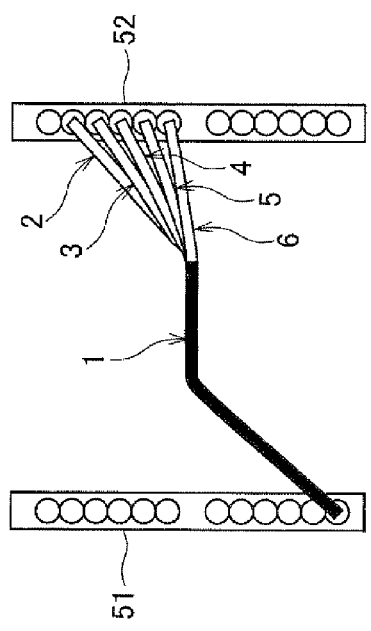
(B)
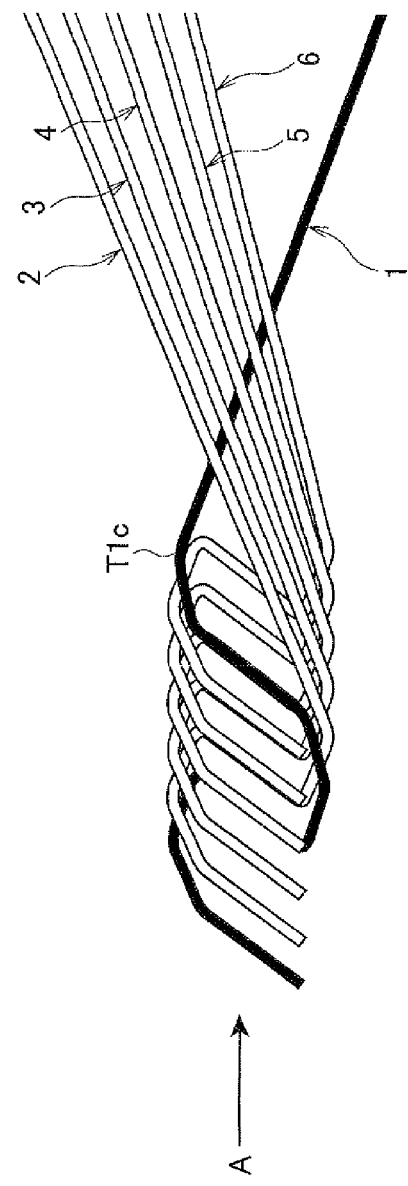

FIG.19
(A)
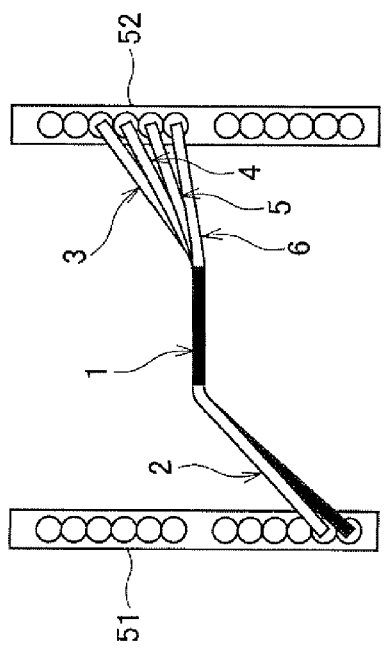
VIEW FROM ARROW A
(B)
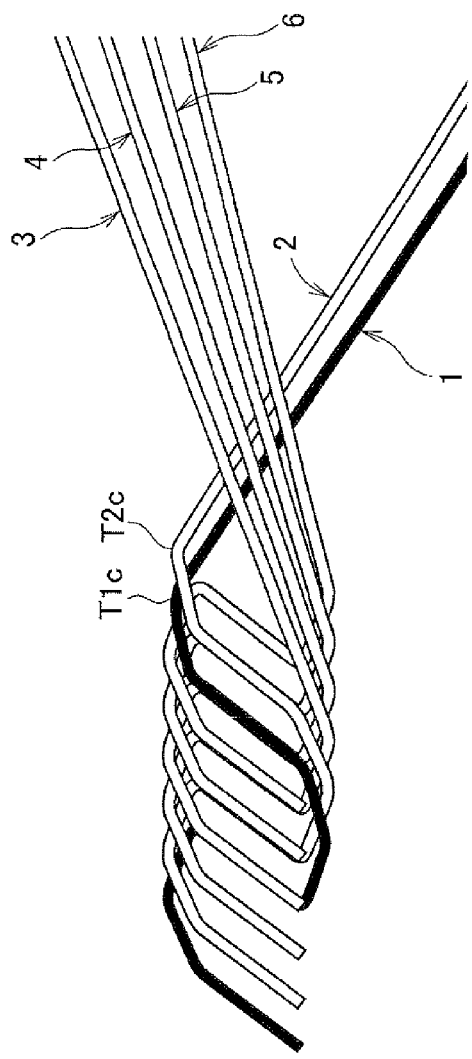

FIG.23
(A)
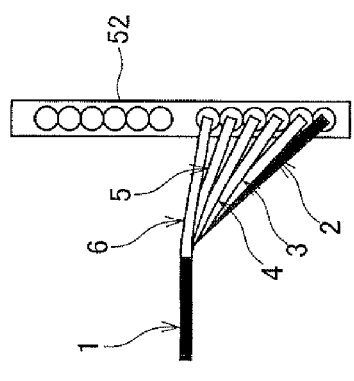
(B)
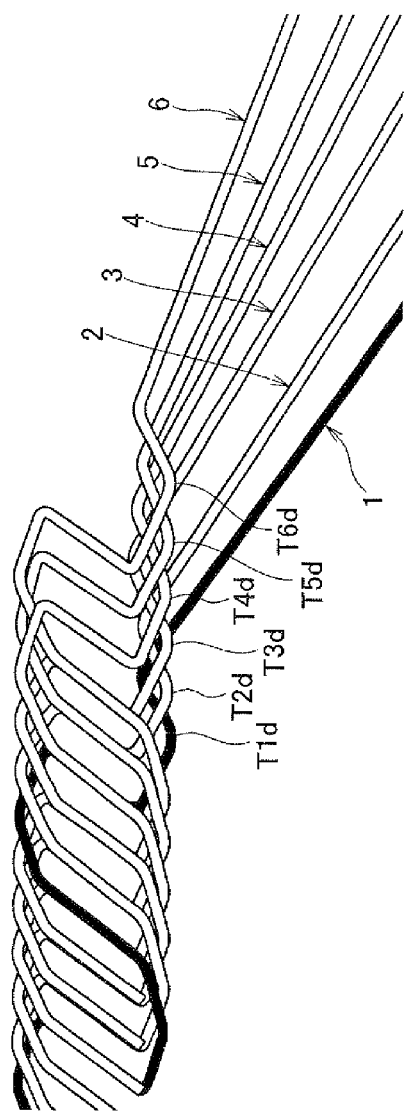

FIG.25
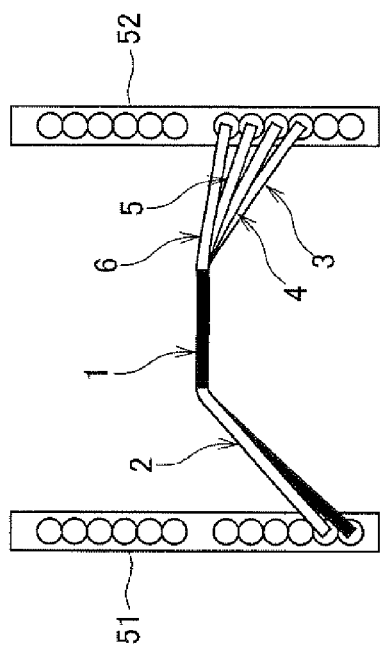
(A) VIEW FROM ARROW A
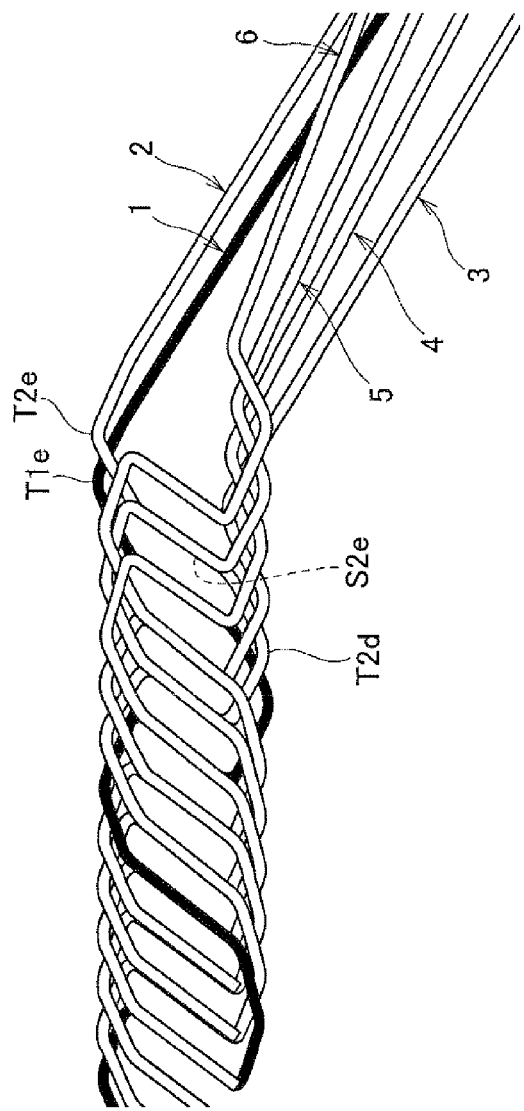
(B)

FIG. 26
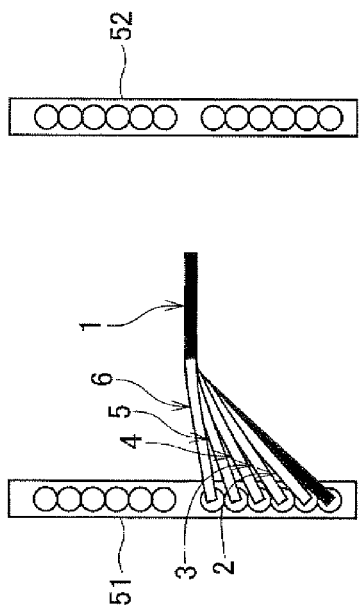
(A) VIEW FROM ARROW A
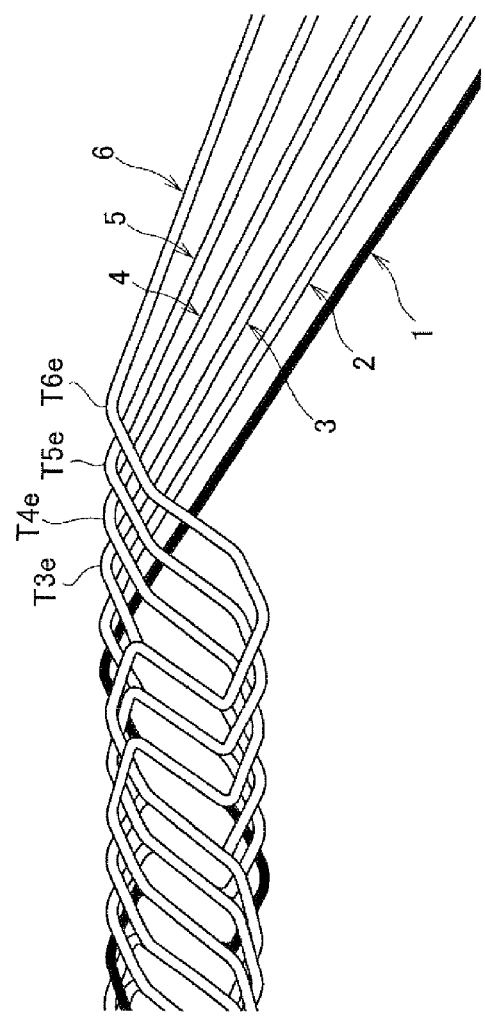
(B)

FIG.28
(A) 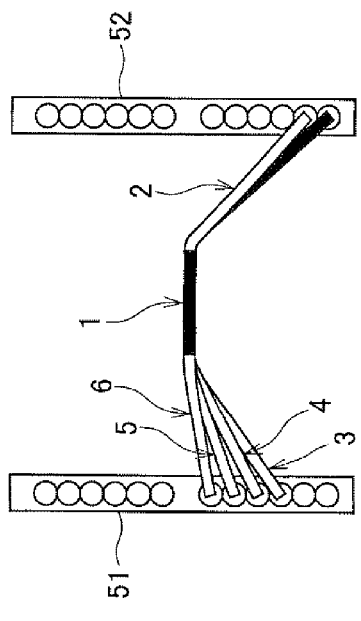
(B) 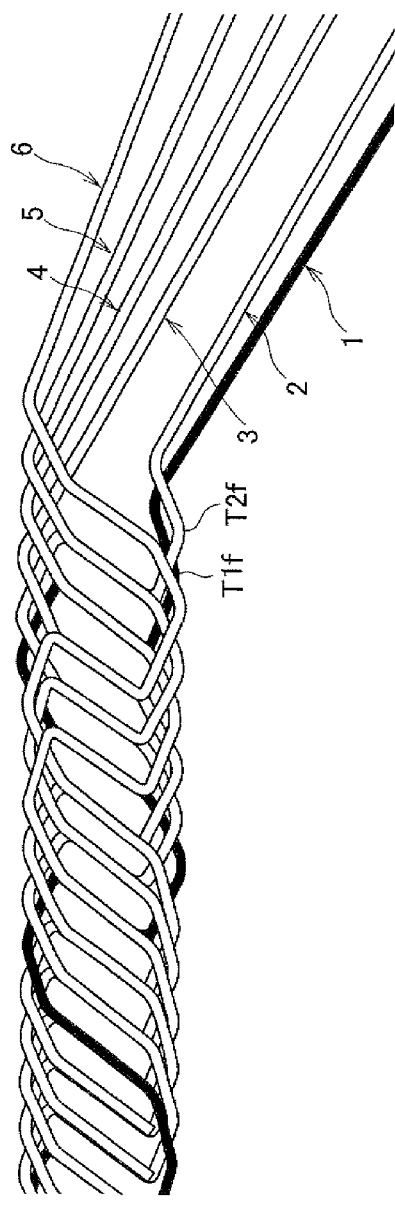

FIG.30
(A) 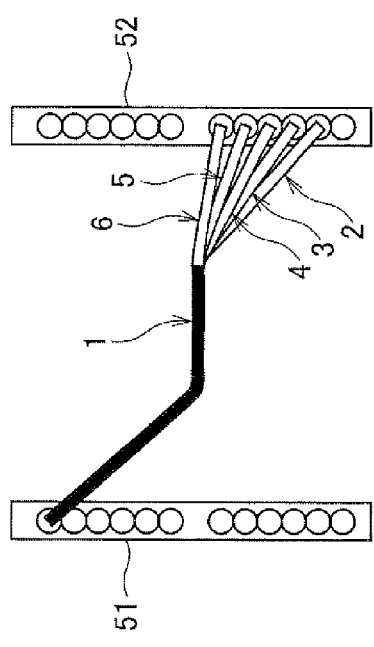
(B) 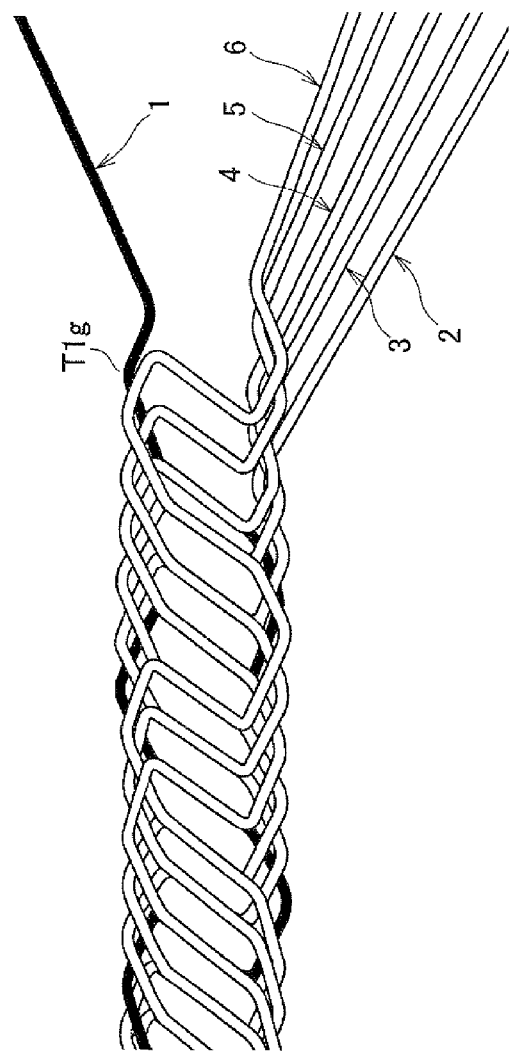

FIG.32
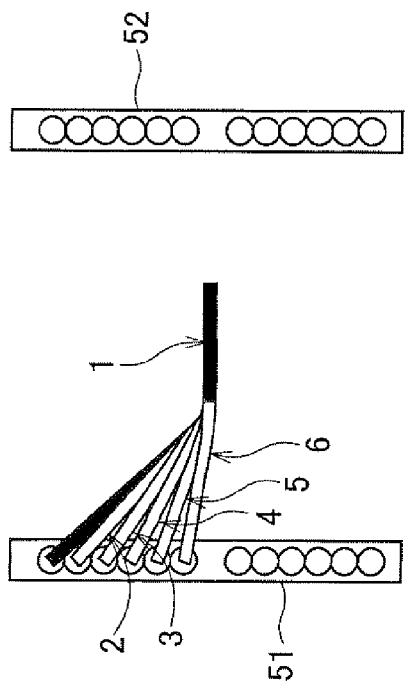
(A) VIEW FROM ARROW A
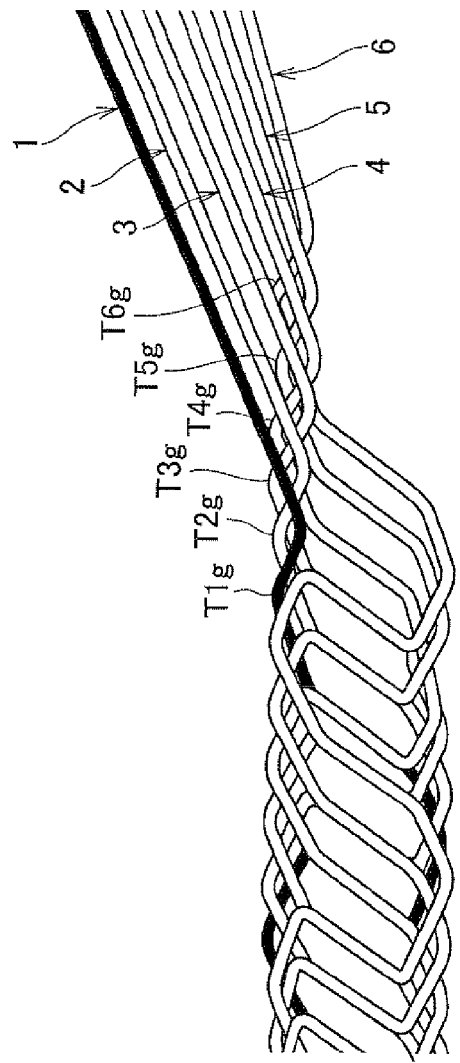
(B)

FIG.33
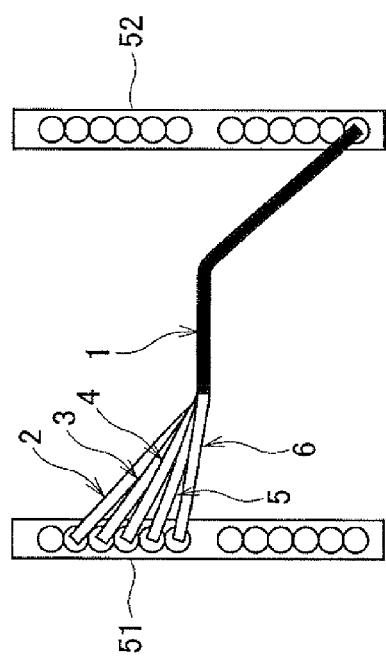
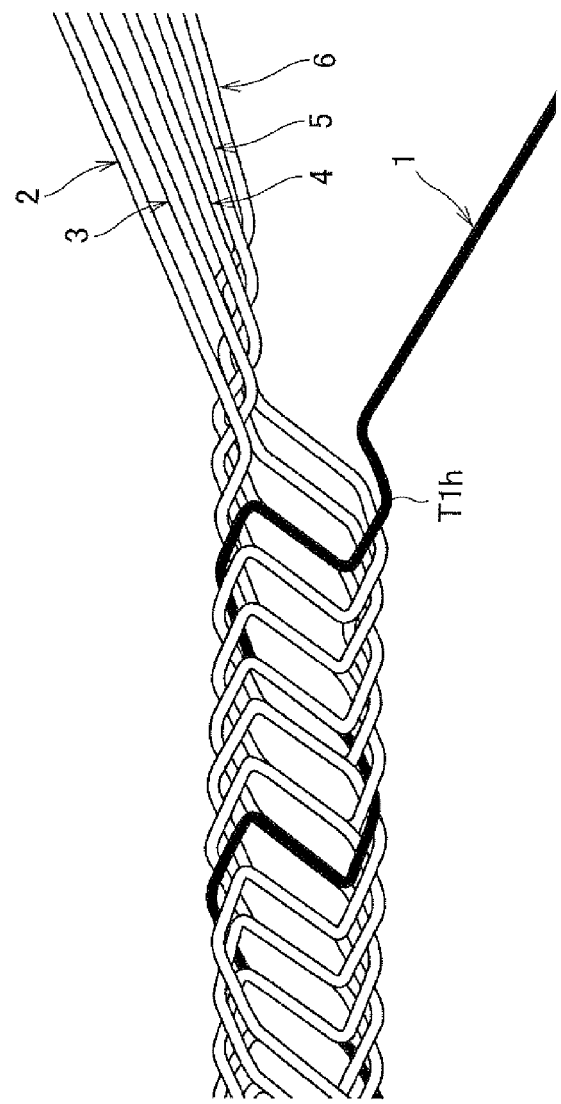

FIG.35
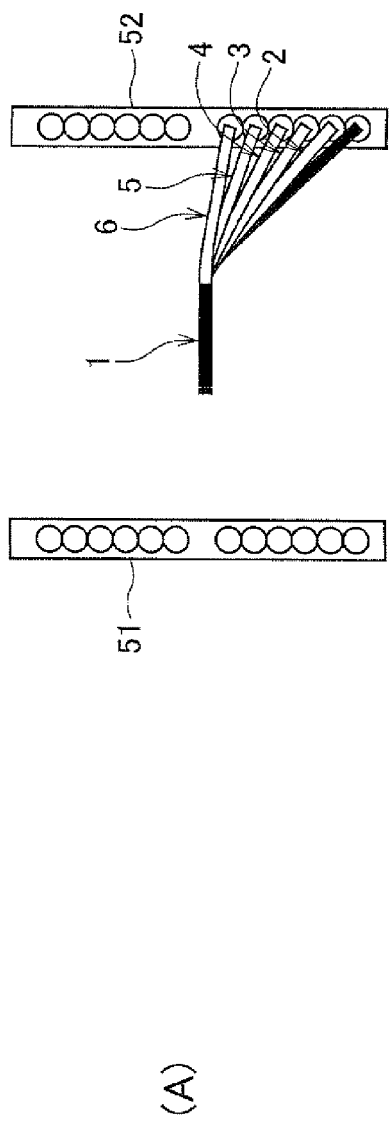
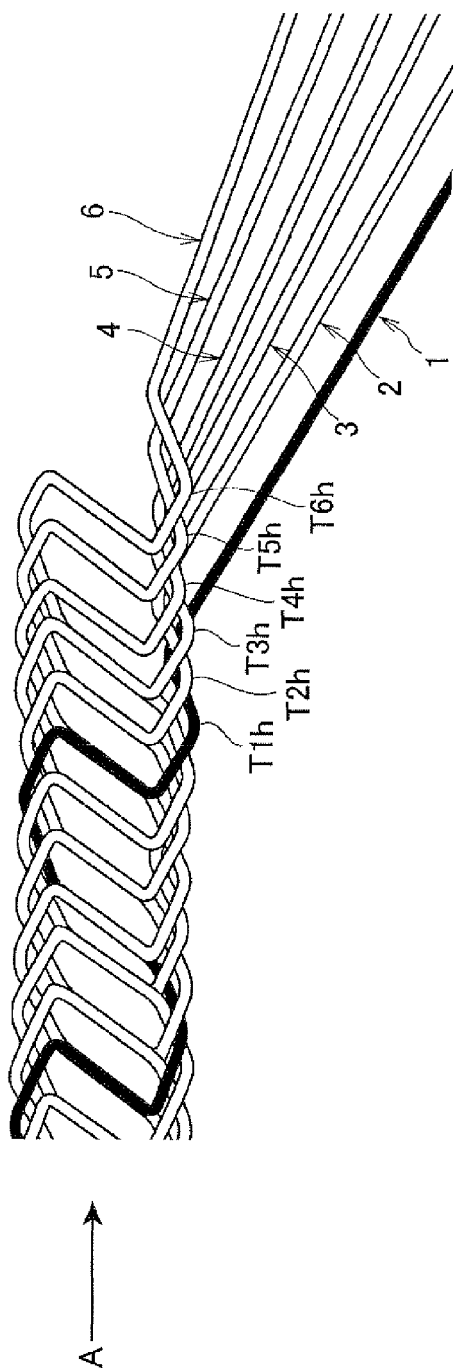

METHOD OF FORMING COIL ASSEMBLY FOR STATOR

CROSS-REFERENCE TO RELATED APPLICATION

This application is related to Japanese Patent Application No. 2008-298416 filed on Nov. 21, 2008, the contents of which are hereby incorporated by reference.

BACKGROUND OF THE INVENTION

1. Field of the Invention

The present invention relates to a method of manufacturing a coil assembly for a stator of an electric rotating machine.

2. Description of Related Art

There are known various methods of manufacturing a coil assembly used, for example, as a stator winding of an electric rotating machine. For example, Japanese Patent Application Laid-Open No. 2004-104841 discloses a method of forming a band-like wire combination by repeating a step of turning, around the axis of a first coil wire formed in a triangle wave shape, a second coil wire by 90 degrees, and advancing the second coil wire by a distance of a half-turn to increase overlap with the first coil wire along the coil direction of the first coil wire, and a step of further turning the second coil wire around the axis by 90 degrees, in order that a plurality of coil wires are successively interlaced by half-turns into the first coil wire.

For another example, U.S. Pat. No. 7,143,501 discloses a method of forming a band-like wire combination by forming a plurality of coil wires in a wave shape while interlacing them in a predetermined state, and a method of shaping the band-like wire combination in a cylindrical shape and winding it around a stator core.

The band-like wire combination formed by the method disclosed in Japanese Patent Application Laid-Open No. 2004-104841 or U.S. Pat. No. 7,143,501 has a double-layered structure in which a plurality of coil wires are overlapped such that they are successively shifted in the longitudinal direction, and adjacent coil wires intersect with each other. Accordingly, when the band-like wire combination is wound in a helical shape to form a cylindrical coil assembly, there arises a step space at each of the transitions between each adjacent loops of the helix (referred to as "loop transition portion" hereinafter). It results in the reduction of the lamination factor of the coil assembly.

To remove this drawback, it is known to form a band-like wire combination from coil wires having a small cross-sectional area, for example from coil wires having a circular cross section, and jamming them into the step spaces to reduce the reduction of the lamination factor. However, using coil wires having a small cross-sectional area results in performance degradation of an electric rotating machine because the resistance of such coil wires is large.

It is also known as a method of manufacturing a coil assembly from a plurality of band-like wire combinations, in which the band-like wire combinations are respectively bent at different curvatures to form a plurality of cylindrical wire combinations having different diameters, and these cylindrical wire combination are disposed concentrically to thereby form a coil assembly with no loop transition portion. However, the coil assembly formed by this method requires electrically connecting the cylindrical wire combinations to one another, and accordingly is difficult to be made compact in size because extra spaces for the electrical connection are needed. In addition, connecting the cylindrical wire combinations to one another brings about increase of manufacturing costs, and degradation of the reliability of the coil assembly due to increase of the number of electrical connections.

SUMMARY OF THE INVENTION

The present invention provides a method of manufacturing a coil assembly for a stator formed with slots comprising:

a coil wire combination forming step of forming a band-like coil wire combination by overlapping a plurality of coil wires in a predetermined state while forming the plurality of the coil wires with in-slot portions to be accommodated in the slots and turn portions each connecting each adjacent two of the in-slot portions; and a shaping step of shaping the band-like coil wire combination into a cylindrical shape by helically winding the band-like coil wire combination;

wherein the coil wire combination forming step is carried out by performing an interlaced part forming step of forming an interlaced part by overlapping the coil wires with each adjacent two of the coil wires intersecting with each other and a non-interlace part forming step of forming an interlaced part by overlapping the coil wires with each adjacent two of the coil wires not intersecting with each other.

According to the present invention, there is provided a coil assembly of the type formed by helically winding band-like wire combinations whose lamination factor at its transitions portions can be made sufficiently high.

Other advantages and features of the invention will become apparent from the following description including the drawings and claims.

BRIEF DESCRIPTION OF THE DRAWINGS

In the accompanying drawings:

FIGS. 11 to 14 are explanatory views for explaining a first process of an interlaced part forming step of a coil wire combination forming step included in the method according the embodiment of the invention;

FIGS. 15 to 17 are explanatory views for explaining a second process of the interlaced part forming step;

FIGS. 18 to 20 are explanatory views for explaining a third process of the interlaced part forming step;

FIGS. 21 to 23 are explanatory views for explaining a first process of a non-interlaced part forming step of the coil wire combination forming step included in the method according the embodiment of the invention;

FIGS. 24 to 26 are explanatory views for explaining a second process of the non-interlaced part forming step;

FIGS. 27 to 29 are explanatory views for explaining a third process of the non-interlaced part forming step;

FIGS. 30 to 32 are explanatory views for explaining the first process of the interlaced part forming step; and FIGS. 33 to 35 are explanatory views for explaining the second process of the interlaced part forming step.

PREFERRED EMBODIMENTS OF THE INVENTION

Figure 1:
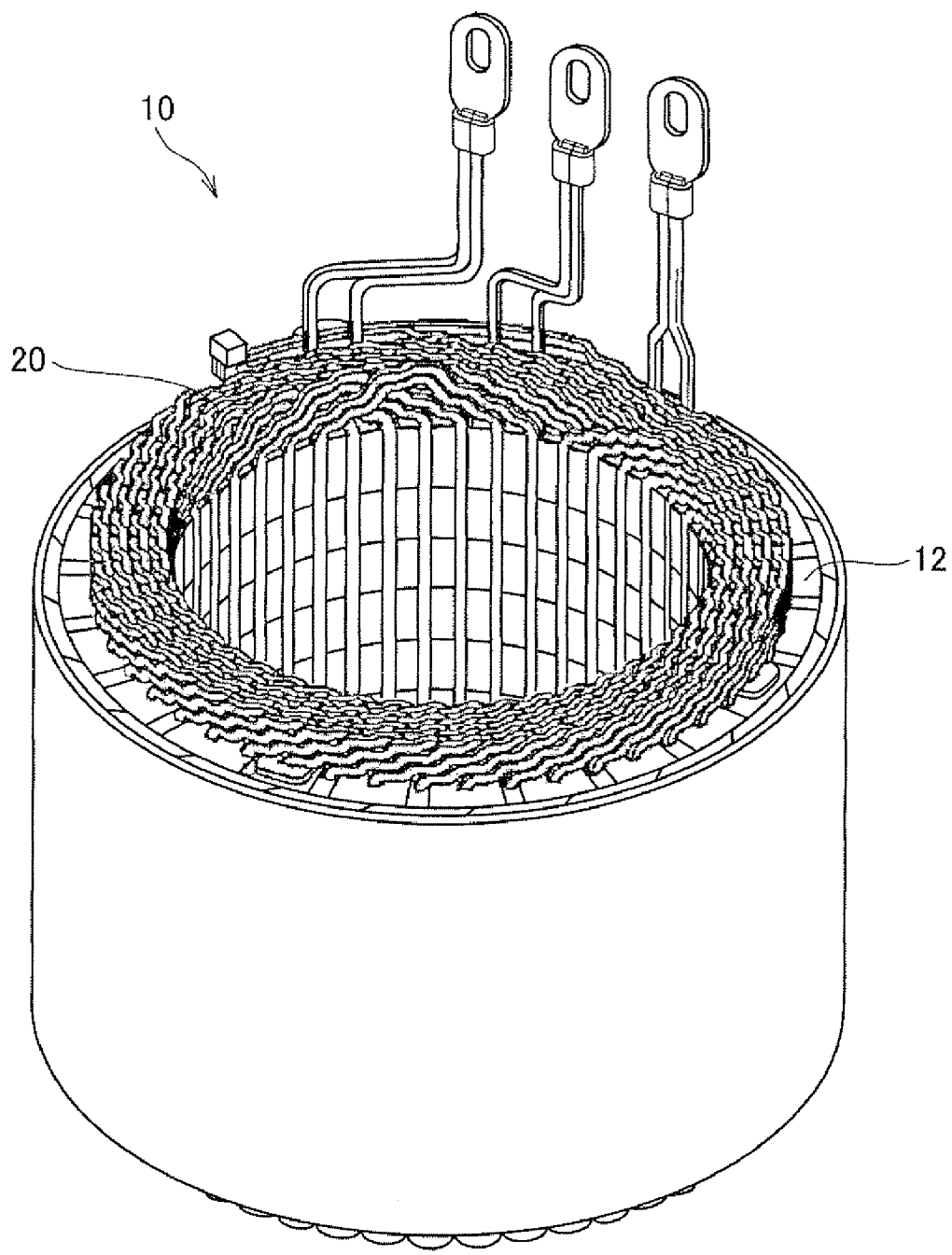
FIG. 1 is a perspective view of a stator including a coil assembly manufactured by a method according to an embodiment of the invention.
Figure 2:
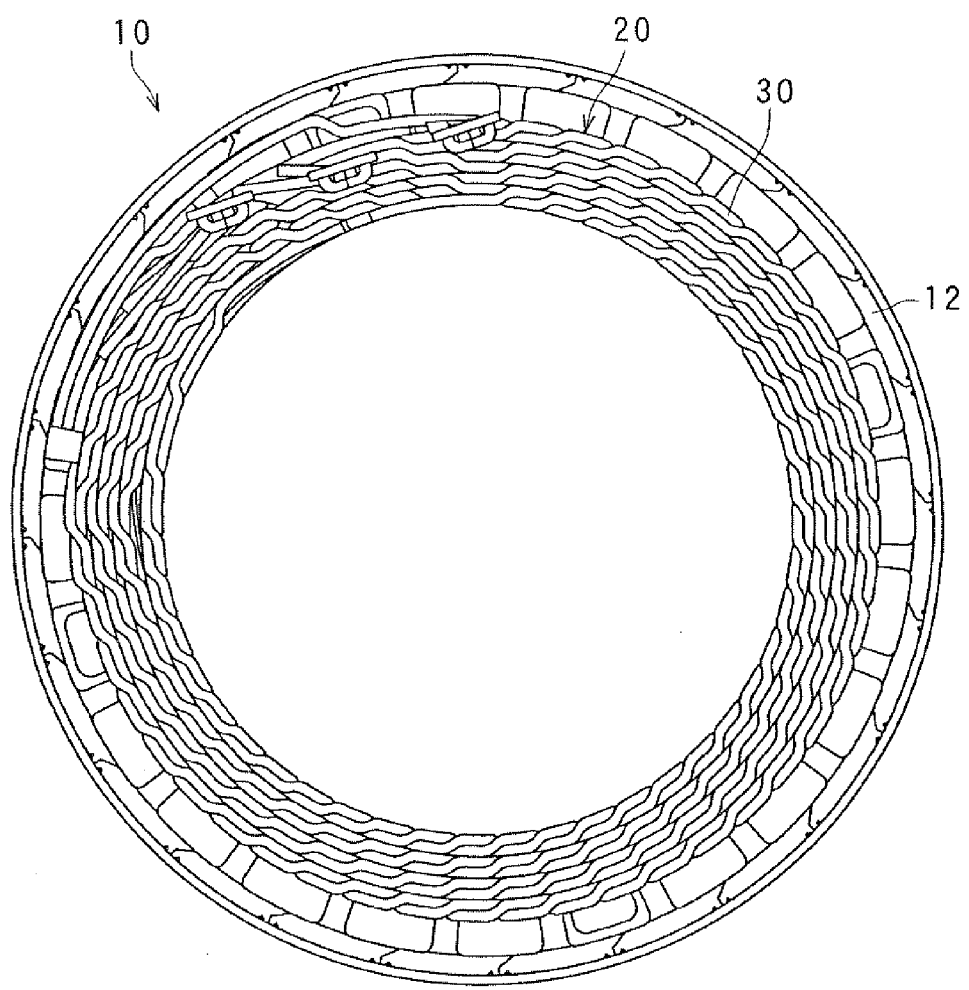
FIG. 2 is a plan view of the stator as viewed from top.
Figure 3:
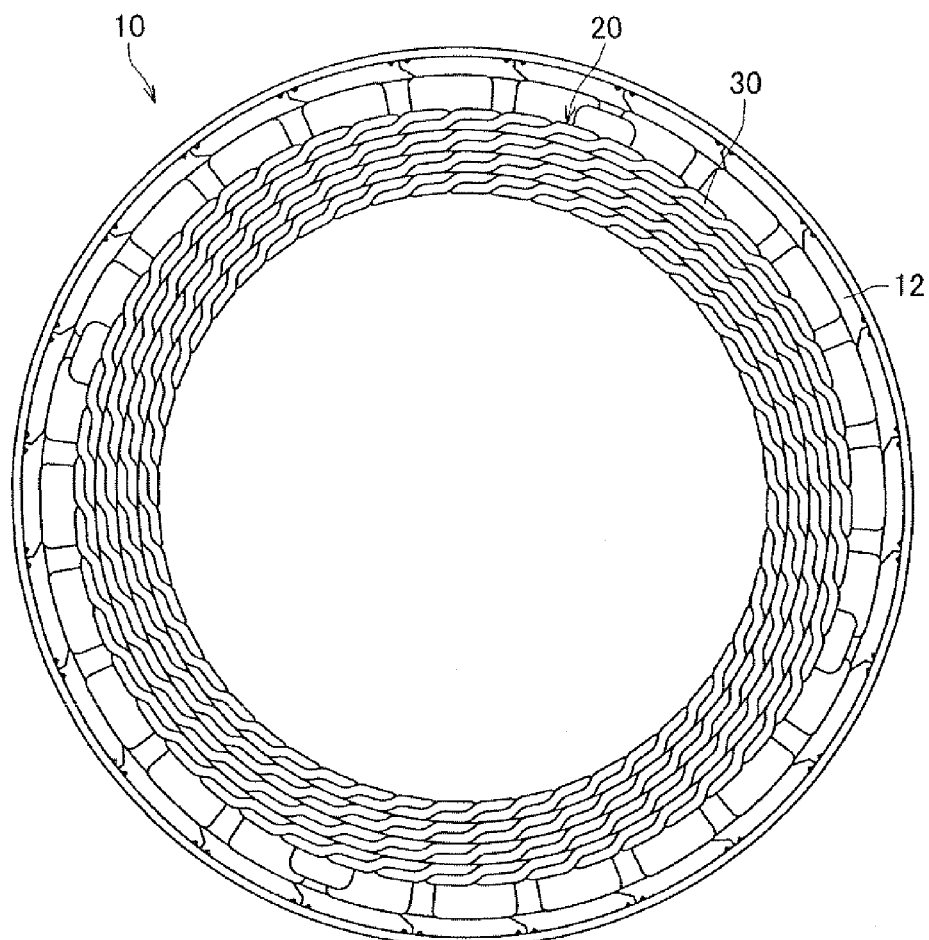
FIG. 3 is a plan view of the stator as viewed from bottom.
Figure 4:
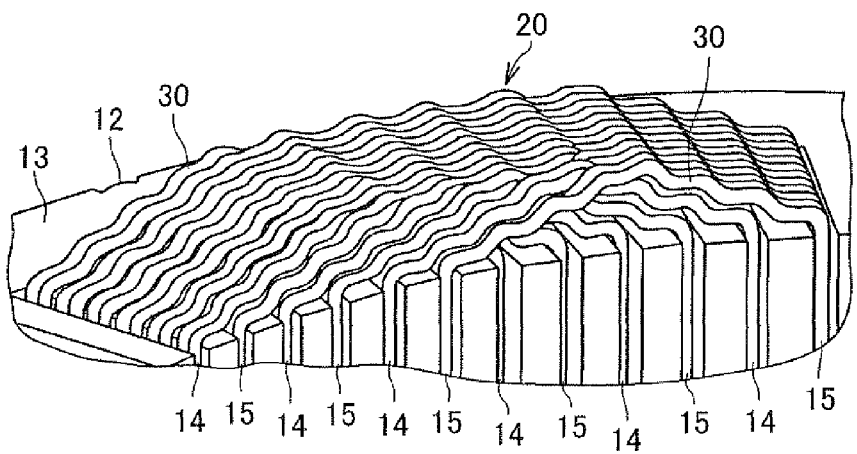
FIG. 4 is a perspective view showing a part of the stator in an enlarged scale.

Prior to describing a method of manufacturing a coil assembly according to an embodiment of the invention, the structure of a stator 10 of an electric rotating machine including a coil assembly 20 manufactured by the method is explained briefly. FIG. 1 is a perspective view of the stator 10 including the coil assembly 20, FIG. 2 is a plan view of the stator 10 as viewed from top, and FIG. 3 is a bottom view of the stator 10 as viewed from bottom. FIG. 4 is a perspective view showing a part of the stator 10 in an enlarged scale.

The stator 10 can be used in an electric rotating machine such as a motor/generator of a vehicle. The stator 10 rotatably houses a rotor (not shown) thereinside. The rotor is provided with a plurality of magnet poles formed in the outer periphery thereof facing the inner periphery of the stator 10, such that the magnet poles of different polarities alternate in the circumferential direction of the rotor. A stator core 12 of the stator 10 is formed by axially laminating magnetic steel plates of a predetermined thickness into a ring shape. As shown in FIG. 4, the stator core 12 is formed with a plurality of slot sets each including a slot 14 and a slot 15 which extend in the axial direction thereof and are adjacent in the circumferential direction thereof. The coil assembly 20 as stator winding is a three-phase winding. In each of the slot sets including the circumferentially adjacent slots 14 and 15, the same one of the three phase windings is accommodated. In each of circumferentially consecutive three of the slot sets, the three phase windings of the coil assembly 20 are accommodated.

Figure 5:
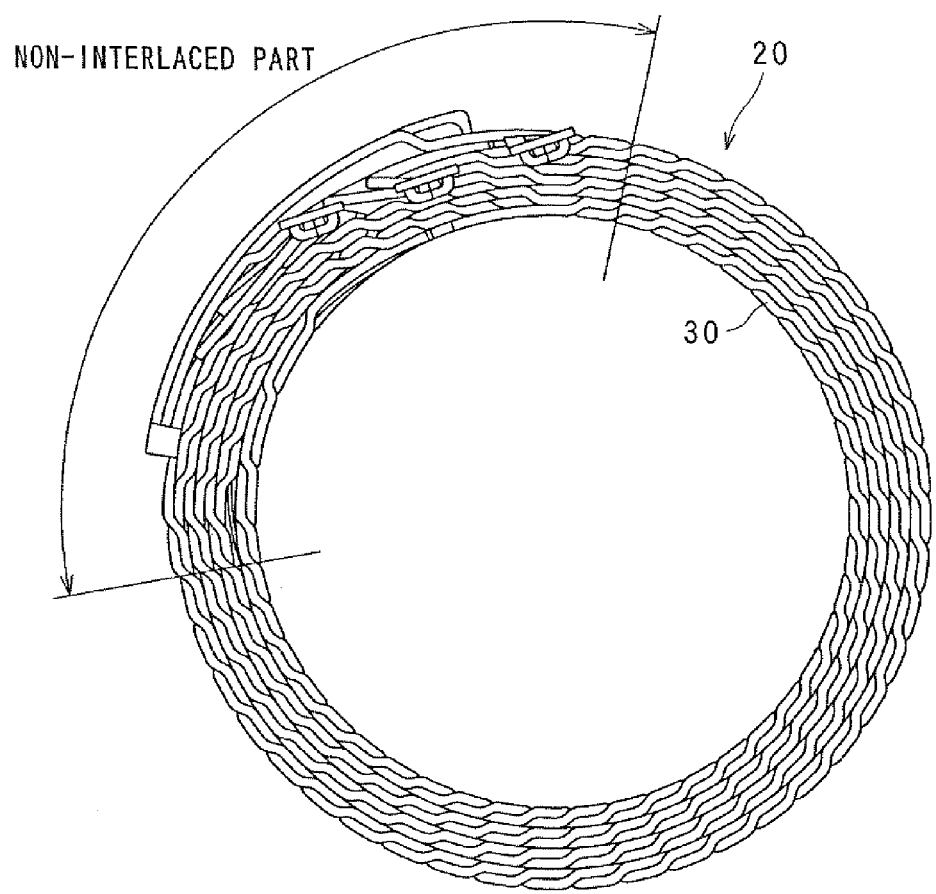
FIG. 5 is a plan view of the coil assembly as viewed from top.
Figure 6:
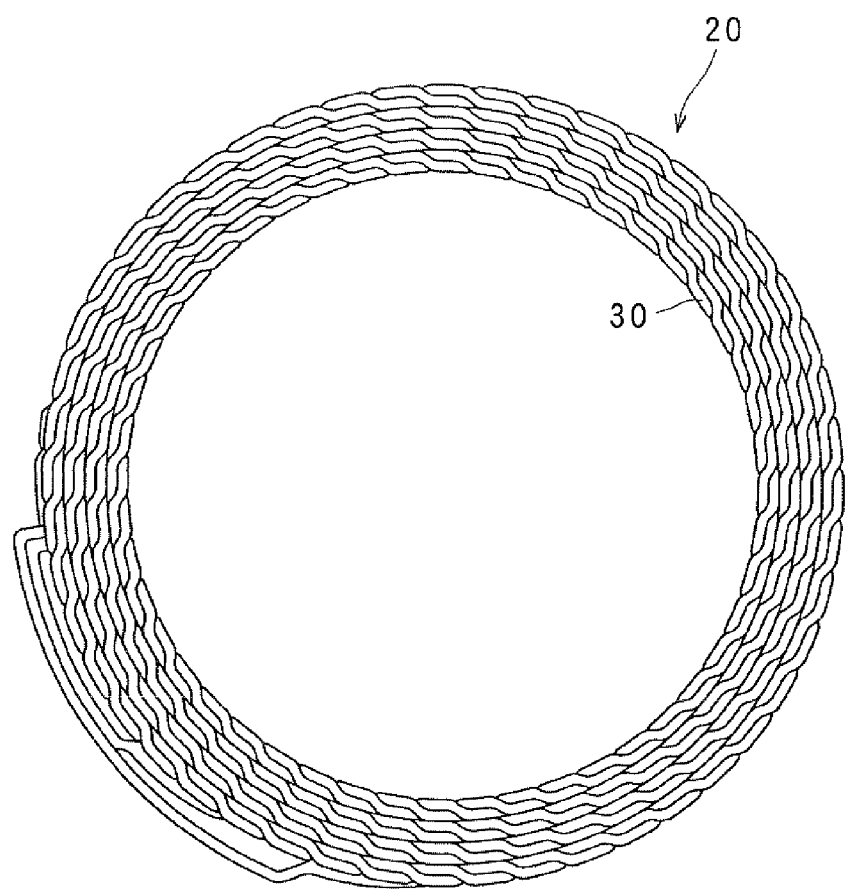
FIG. 6 is a bottom view of the coil assembly as viewed from bottom.
Figure 7:
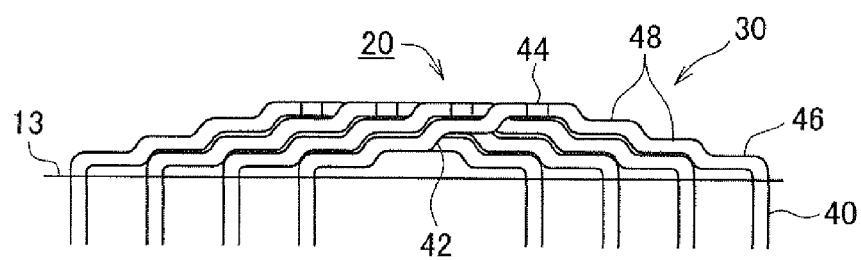
FIG. 7 is a front view of the coil assembly showing a coil end thereof.
Figure 8:
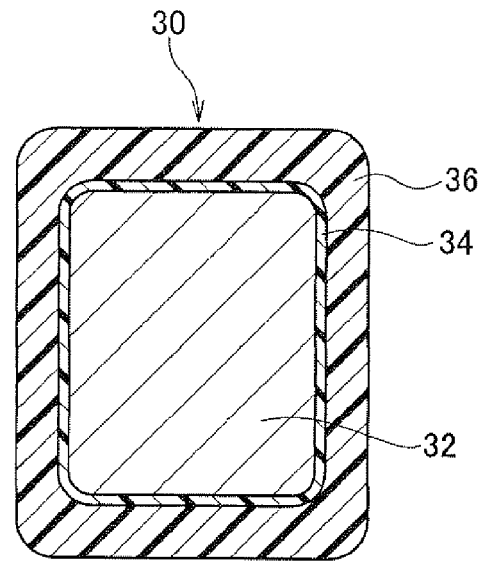
FIG. 8 is a cross-sectional view of a coil wire constituting the coil assembly.
Figure 9:
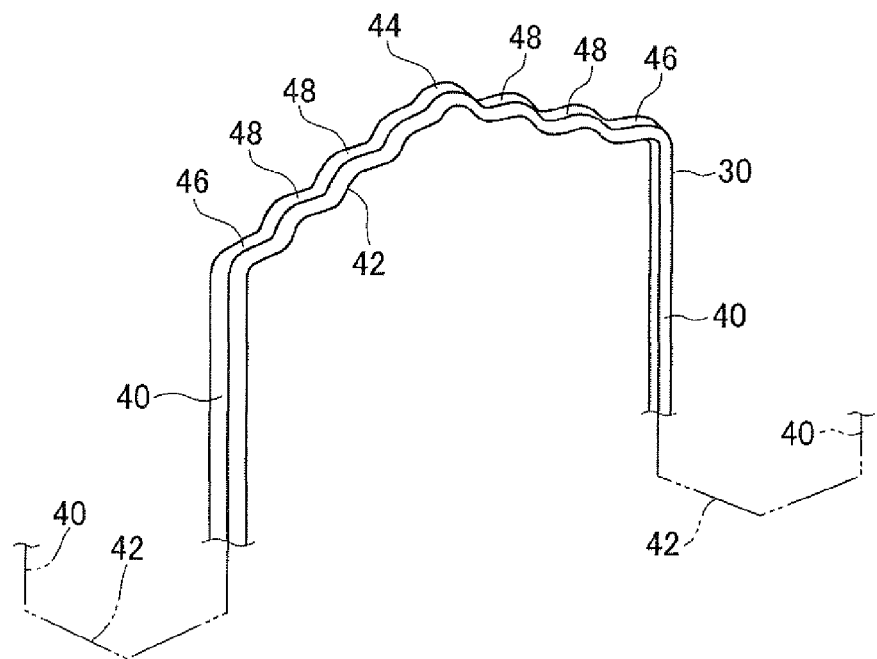
FIG. 9 is a perspective view of the coil wire showing a turn portion thereof.

Next, the structure of the coil assembly 20 is explained. FIG. 5 is a plan view of the coil assembly 20 as viewed from top, FIG. 6 is a bottom view of the coil assembly 20 as viewed from bottom, and FIG. 7 is a front view of the coil assembly 20 showing a coil end of the coil assembly 20. FIG. 8 is a cross-sectional view of a coil wire 30. FIG. 9 is a perspective view of the coil wire 30 showing a turn portion 42 of the coil wire 30.

As shown in FIG. 8, the coil wire 30 constituting the coil assembly 20 includes a copper conductor 32 and an insulating film formed of an inner layer 34 and an outer layer 36 for insulation of the conductor 32. The inner layer 34 covers the outer surface of the conductor 32, and the outer layer 36 covers the outer surface of the inner layer 34. The thickness of the insulating film is between 100 μm and 200 μm. Since the insulating film is sufficiently thick, it is not necessary to interpose insulating paper or the like between the coil wires 30 for insulation therebetween.

The outer layer 36 is made of insulating material such as nylon, and the inner layer 34 is made of insulating material having a glass transition temperature higher than that of the outer layer 36 such as thermoplastic resin or polyamideimide. Accordingly, since the outer layer 36 softens more rapidly than the inner layer 34, the coil wires 30 accommodated in the same slot 14 or 15 heat-adhere to each other. As a result, since the coil wires 30 accommodated in the same slot 14 or 15 become integrated and rigid, the mechanical strength of the coil wires 30 in the slot 14 increases. Furthermore, if excessive vibration occurs, since the adhered portions between the inner layer 34 and the outer layer 36 come off from each other more earlier than the adhered portions between the inner layer 34 and the conductor 32, the adhesion between the inner layer 34 and the conductor 32 can be maintained to maintain insulation therebetween.

As shown in FIG. 9, each of the coil wires 30 includes in-slot portions 40 to be accommodated in the slots 14 or 15 (see FIG. 4) of the stator core 12, and turn portions 42 projecting from the slots 14 or 15 and connecting the adjacent in-slot portions 40. The coil wires 30 are wave-wound on the stator core 12 to form the stator winding (coil assembly) 20. The turn portions 42 are located at both axial ends of the stator core 12.

As shown in FIG. 7, the turn portion 42 is formed with a crank portion 44 with no twist at its approximately center position. The crank portion 44 is formed in a crank shape along an end surface 13 of the stator core 12. The crank height of the crank portion 44 is approximately a half of the width of the coil wire 30. This makes it possible to tightly wind the turn portions 42 of the radially adjacent coil wires 30 with each other. As a result, since the radial width of the coil end can be made small, it is possible to prevent the coil assembly 20 from projecting radially outwardly.

The turn portion 42 is formed with a step portion 42 along the axial end surface 13 at each of its projecting positions at which the turn portion 46 projects from the slot 14 or 15. This makes the distance between the projecting positions of the coil wire 30, that is the length of the base of a triangular section formed by the turn portion 42 smaller than the spacing between the slots accommodating the same coil wire 30. As a result, the height (the axial length) of the coil end can be made small.

When the length of the step portion 46 along the end surface 13 is d1, and the spacing between the circumferentially adjacent slots is d2, the relationship of $d1 \leq d2$ holds. This makes it possible to avoid interference between the step portion 46 of the coil wire 30 and another coil wire 30 projecting from the circumferentially adjacent slot. As a result, it becomes unnecessary to increase the height of the coil end, or increase the axial width of the coil end to avoid interference between the coil wires 30 respectively projecting from the circumferentially adjacent slots. Further, since the axial width of the coil end can be reduced, it is possible to prevent the coil assembly 20 from projecting radially outward.

The coil wire 30 is further formed with two step portions 48 between the crank portion 44 and each of the step portions 46. Accordingly, the turn portion 42 of the coil wire 30 is formed with the six step portions 46 and 48 and the single crank portion 44. The height of the turn portion 42 formed with the above turn portions can be made small compared to an equivalent one of a triangular shape not formed with such step portions. The step portions 48 are formed to be parallel to the end surface 13 of the stator core 12 like the step portions 46. Accordingly, the turn portion 42 of the coil wire 30 has a profile shape of two staircases facing each other across the crank portion 44.

In this embodiment, each pair of the slots 14 and 15 corresponds to each one of the magnetic poles of the rotor for each of the three phase windings. Accordingly, the number of the circumferentially consecutive slots per one pole is 6 (=3×2). Hence, since each coil wire 30 is accommodated in every six of the slots, it is preferable that the turn portion 42 is formed with 7 (=3×2+1) step portions including the crank portion 44 at the approximately center position thereof in order to avoid interference between the coil wires 30 projecting from the circumferentially adjacent slots. Thus, since each coil wire 30 is formed with the six step portions 46 and 48 and the single crank portion 44 at each coil end, the height and the axial width of the coil end can be reduced.

Next, a method of manufacturing the coil assembly 20 according to an embodiment of the invention is described with reference to FIGS. 10 to 35. The method of manufacturing the above described coil assembly 20 includes a coil wire combination forming step of forming a band-like wire combination by overlapping a plurality of coil wires in a predetermined state while forming in-slot portions and turn portions in the coil wires, and a shaping step of shaping the band-like wire combination into a cylindrical shape by winding the band-like wire combination into a helical shape.

Figure 10:
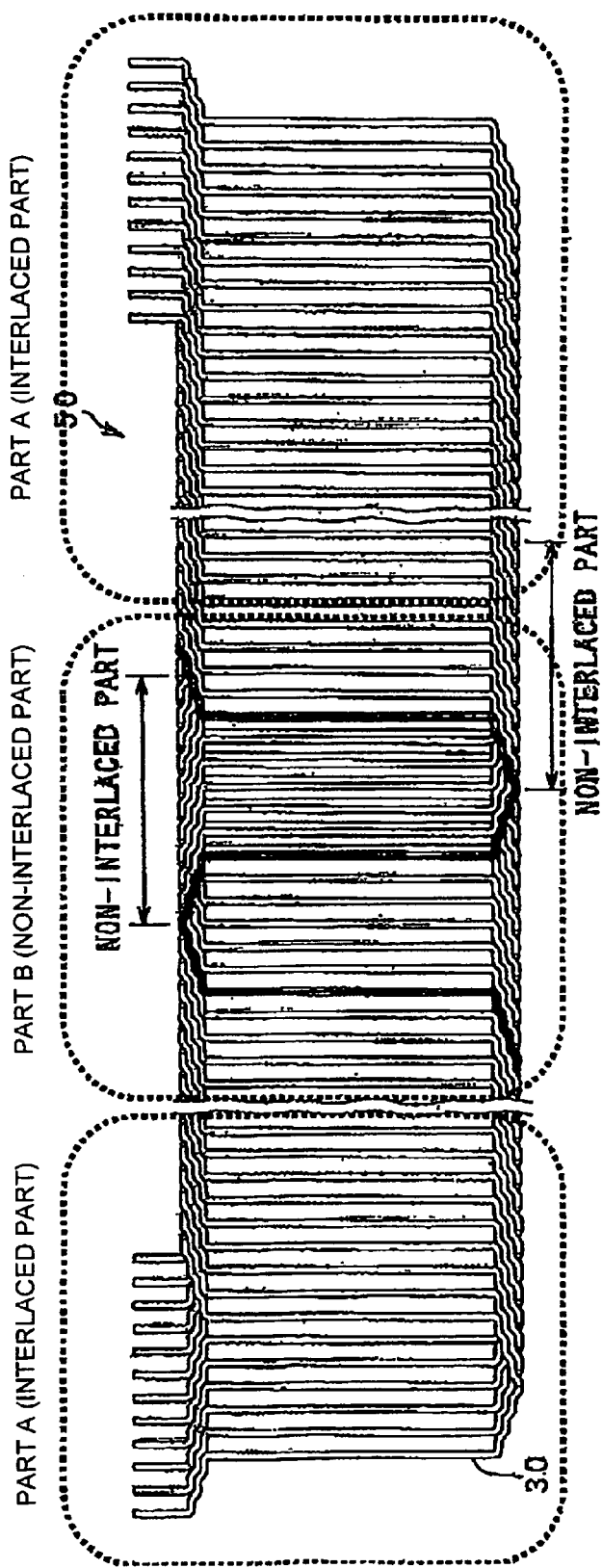
FIG. 10 is a front view of a coil wire combination formed by a coil wire combination forming step included in the coil assembly manufacturing method according to the embodiment of the invention.

First, the coil wire combination forming step is explained. As shown in FIG. 10, a band-like wire combination 50 formed by the coil wire combination forming step is constituted of twelve coil wires. However, to avoid the drawings and their explanations from becoming too complicated, the following explanations are made assuming that the band-like wire combination 50 is constituted of six coil wires (first to six coil wires 1 to 6). In each of FIGS. 11 to 35, (B) is a perspective view of the first to sixth coil wires 1 to 6 showing their overlapped state, and (A) is a front view of (B) as viewed along the arrow A. In each of FIGS. 11 to 35, although the turn portions of the first to sixth coil wires 1 to 6 have the profile shape of two staircases being opposed to each other, they are shown to have a chevron-like shape for simplification of the drawings.

The first to sixth coil wires 1 to 6 are wound respectively around separate bobbins detachably held by a bobbin holder 51 in advance. Each of the first to sixth coil wires 1 to 6 is drawn from the bobbin and subjected to a shaping process from its front end to its rear end with the front end being held by a jig. Incidentally, when the first to sixth coil wires 1 to 6 are subjected to the shaping process, their rear end sides are moved.

In this embodiment, the coil wire combination forming step is carried out by repeatedly performing an interlaced part forming step including first and second processes, a non-interlaced part forming step including first and second processes. The interlaced part forming step is for forming an interlaced part by overlapping the first to sixth coil wires with adjacent coil wires intersecting with each other. The non-interlaced part forming step is for forming a non-interlaced part by overlapping the first to sixth coil wires with adjacent coil wires not intersecting with each other.

As shown in FIG. 11, at the beginning of the first process of the interlaced part forming step, the first coil wire 1 is formed with a first in-slot portion S1a and a first turn portion T1a at its front end portion by use of a shaping apparatus (not shown), and then held at a predetermined position. At this time, the bobbin of the first coil wire 1 is held at the first bottom position of the bobbin holder 51.

Subsequently, as shown in FIG. 12, the second coil wire 2 is formed with a first in-slot portion S2a and a first turn portion T2a at its front end portion by use of the shaping apparatus. After that, the first turn portion T2a of the second coil wire 2 is moved by a distance equal to the spacing between the adjacent slots in the longitudinal direction, so that it overlaps with one lateral side (the near side along arrow A of FIG. 12B) of the first turn portion T1a of the first coil wire 1. At this time, the bobbin of the second coil wire 2 is held at the second bottom position of the bobbin holder 51.

Next, as shown in FIG. 13, the third coil wire 3 is formed with a first in-slot portion S3a and a first turn portion T3a at its front end portion by use of the shaping apparatus. Subsequently, the first turn portion T3a of the third coil wire 3 is moved by a distance equal to the spacing between the adjacent slots in the longitudinal direction, so that it overlaps with one lateral side (the near side along arrow A of FIG. 13B) of the second turn portion T2a of the second coil wire 2. At this time, the bobbin of the third coil wire 3 is held at the third bottom position of the bobbin holder 51.

Thereafter, as shown in FIG. 14, the fourth to sixth coil wires 4 to 6 are subjected to the above first process like the second and third coil wires 2 and 3. As a result, first turn portions T4a, T5a and T6a of the fourth to sixth coil wires 4 to 6 are formed to successively overlap with one lateral side of the first turn portion T3a of the third coil wire 3 outwardly (along the direction of arrow A in FIG. 14B) in the state of being successively shifted by a distance equal to the spacing between the adjacent slots in the longitudinal direction. At this time, the bobbins of the fourth to sixth coil wires 4 to 6 are held respectively at the fourth to sixth bottom positions of the bobbin holder 51.

Figure 15:
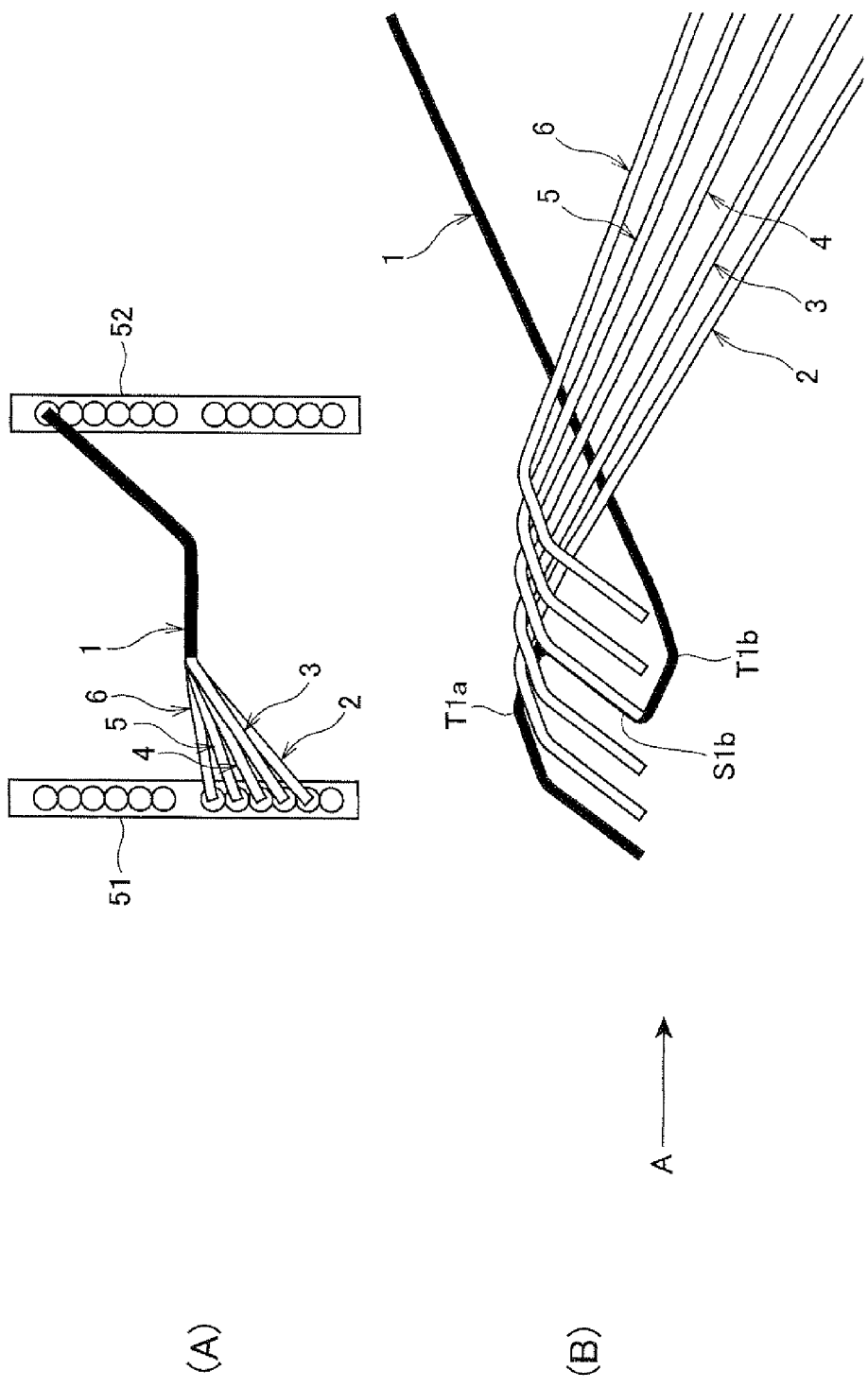

After completion of the first process of the interlaced part forming step described above, the second process of the interlaced part forming step is performed. At the beginning of the second process, as shown in FIG. 15, the first coil wire 1 is formed with a second in-slot portion S1b and a second turn portion T1b continuing to the first turn portion T1a of the first coil wire by use of the shaping apparatus, and then held at a predetermined position. At this time, the bobbin of the first coil wire 1 is moved to the first top position of a bobbin holder 52 disposed opposite to the bobbin holder 51 and held there.

Figure 16:
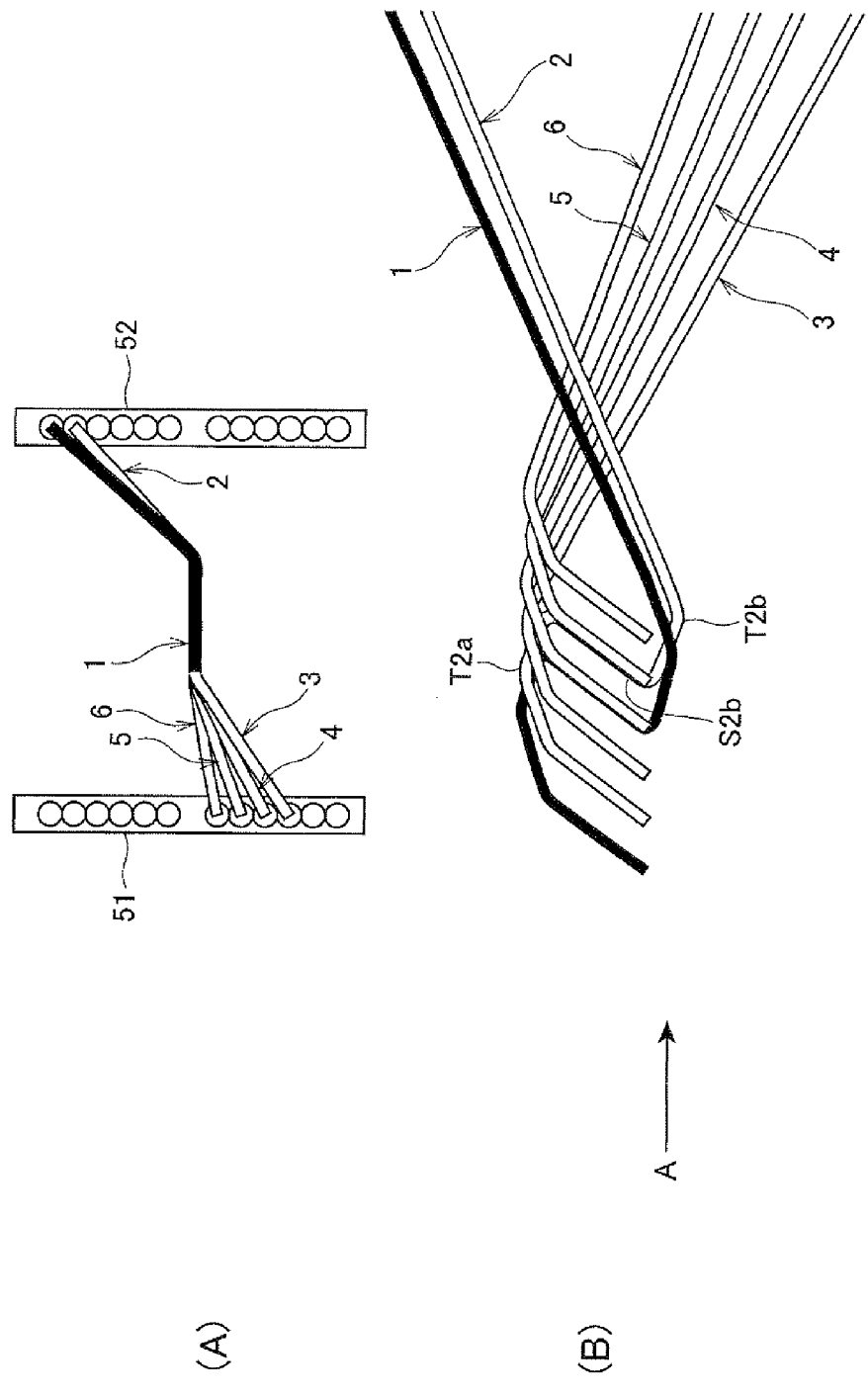

Subsequently, as shown in FIG. 16, the second coil wire 2 is formed with a second in-slot portion S2b and a second turn portion T2b continuing to the first turn portion T2a of the first coil wire by use of the shaping apparatus, and then is held at a predetermined position. Subsequently, the second turn portion T2b of the second coil wire 2 is moved by a distance equal to the spacing between the adjacent slots in the longitudinal direction, so that it intersects and overlaps with the other lateral side (the far side along arrow A of FIG. 16B) of the second turn portion T1b of the first coil wire 1. At this time, the bobbin of the second coil wire 2 is moved to the second top position of the bobbin holder 52, and held there.

Thereafter, as shown in FIG. 17, the third to sixth coil wires 3 to 6 are successively subjected to the above second process like the second coil wire 2. As a result, second turn portions T3b, T4b, T5b and T6b of the third to sixth coil wires 3 to 6 are formed to successively intersect and overlap outwardly (along the direction of arrow A in FIG. 17B) with the other lateral side of the second turn portion T2b of the second coil wire 2 in the state of being successively shifted by a distance equal to the spacing between the adjacent slots in the longitudinal direction. At this time, the bobbins of the third to sixth coil wires 3 to 6 are moved respectively to the third to sixth top positions of the bobbin holder 52 and held there.

Figure 20:
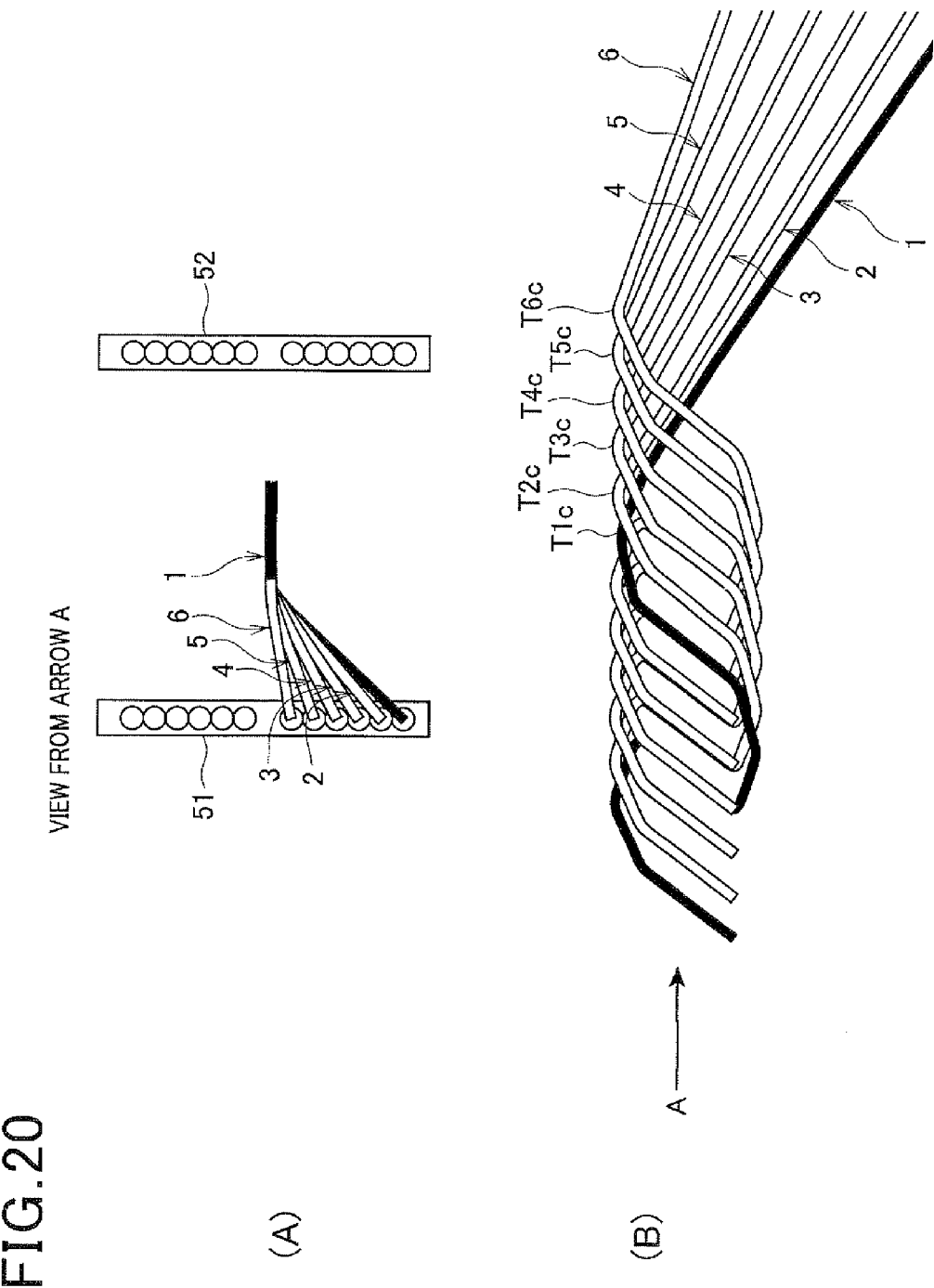

After completion of the second process of the interlaced part forming step described above, as shown in FIGS. 18 to 20, the first to sixth coil wires 1 to 6 are subjected to the first process of the interlaced part forming step again. As a result, as shown in FIG. 20, third turn portions T2c, T3c, T4c, T5c and T6c of the second to sixth coil wires 2 to 6 are formed to successively intersect and overlap outwardly (along the direction of arrow A in FIGS. 18B to 20B) with one lateral side of a third turn portion T1c formed in the first coil wire 1 in the state of being successively shifted by a distance equal to the spacing between the adjacent slots in the longitudinal direction. At this time, the bobbins of the second to sixth coil wires 2 to 6 are moved respectively to the second to sixth bottom positions of the bobbin holder 51 and held there.

The first and second processes of the interlaced part forming step are performed repeatedly by the number of times determined depending on the length of the interlaced part to be formed, or the number of the turn portions to be formed in each of the first to sixth coil wires 1 to 6. As a result, there is obtained an interlaced part in which the coil wires are overlapped by the number of times depending on the number of times that the first and second processes have been performed with adjacent coil wires intersecting with each other. Since the second process and the first process performed after the first process is performed for the second time, are the same as above, their explanations are omitted.

Figure 21:
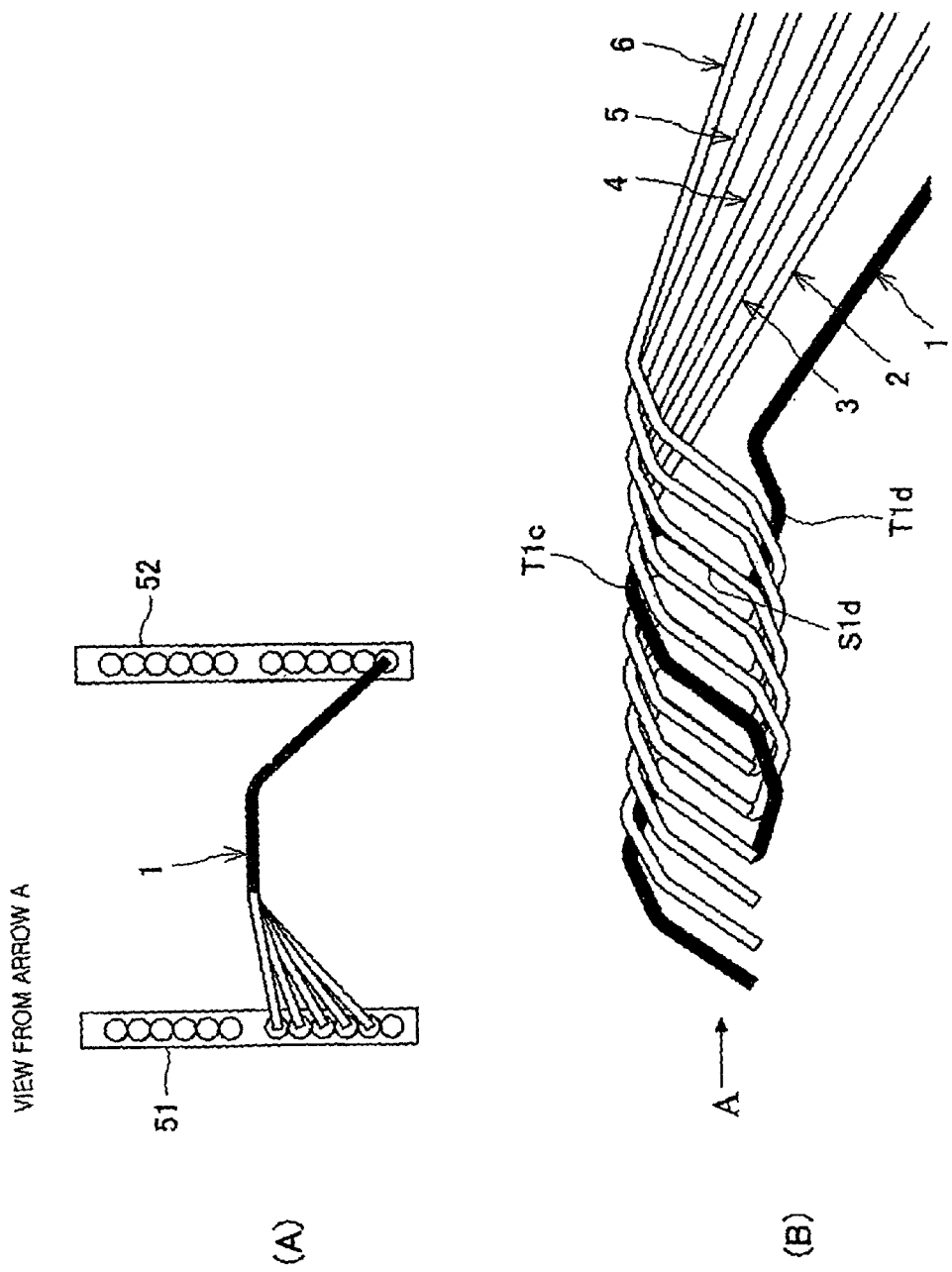

After completion of the first-time interlaced part forming step, the non-interlaced part forming step in which its first and second processes are repeatedly performed is carried out. As shown in FIG. 21, at the beginning of the first process of the non-interlaced part forming step, the first coil wire 1 is formed with a fourth in-slot portion S1d and a fourth turn portion T1d continuing to the third turn portion T1c of the first coil wire 1 by use of the shaping apparatus, and then held in a predetermined position. At this time, the bobbin of the first coil wire 1 is moved to the first bottom position of the bobbin holder 52, and held there.

Figure 22:
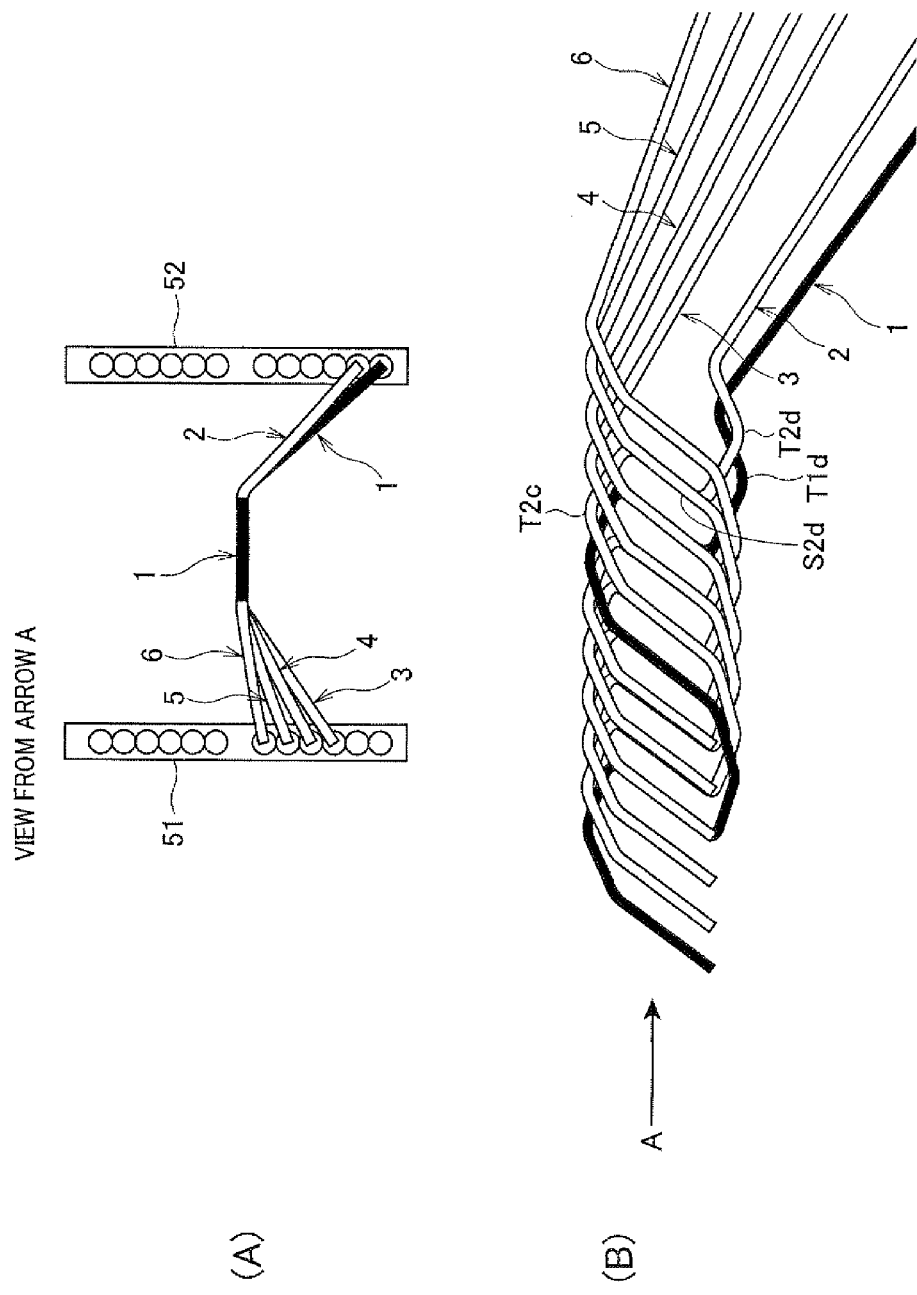

Next, as shown in FIG. 22, the second coil wire 2 is formed with a fourth in-slot portion S2d and a fourth turn portion T2d continuing to the third turn portion T2c of the second coil wire 2 by use of the shaping apparatus. Subsequently, the fourth turn portion T2d of the second coil wire 2 is moved by a distance equal to the spacing between the adjacent slots in the longitudinal direction, so that it overlaps with one lateral side (the near side of FIG. 22) of the fourth turn portion T1d of the first coil wire 1. At this time, the bobbin of the second coil wire 2 is moved to the second bottom position of the bobbin holder 52, and held there.

Thereafter, as shown in FIG. 23, the third to sixth coil wires 3 to 6 are subjected to the above first process of the non-interlaced part forming a step like the second coil wire 2. As a result, fourth turn portions T3d, T4d, T5d and T6d of the third to sixth coil wires 3 to 6 are formed to successively overlap with one lateral side inwardly (in the opposite direction of arrow A in FIG. 23B) of the fourth turn portion T2d of the second coil wire 2 in the state of being successively shifted by a distance equal to the spacing between the adjacent slots in the longitudinal direction. At this time, the bobbins of the third to sixth coil wires 3 to 6 are moved respectively to the third to sixth bottom positions of the bobbin holder 52 and held there.

Figure 24:
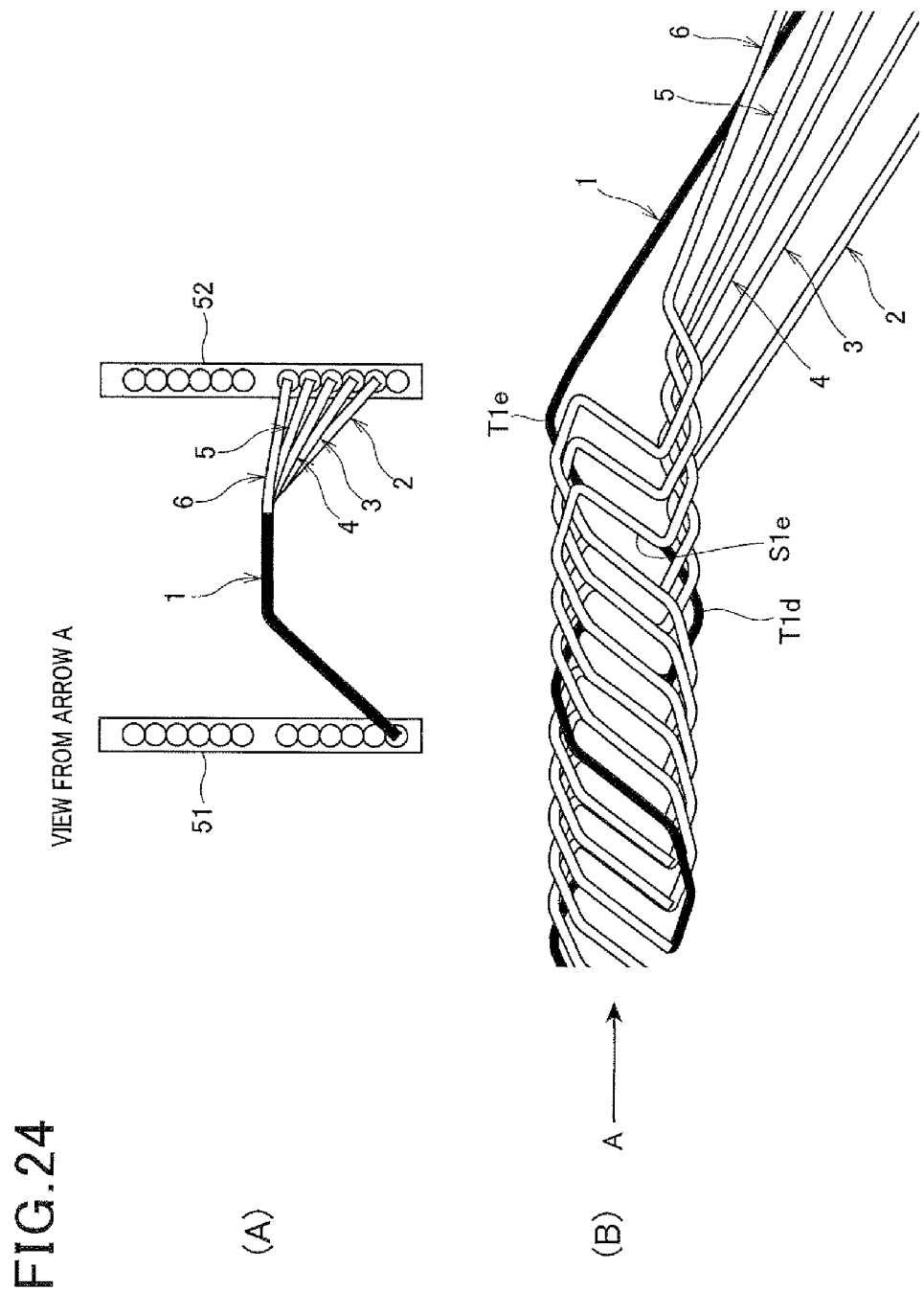
Figure 27:
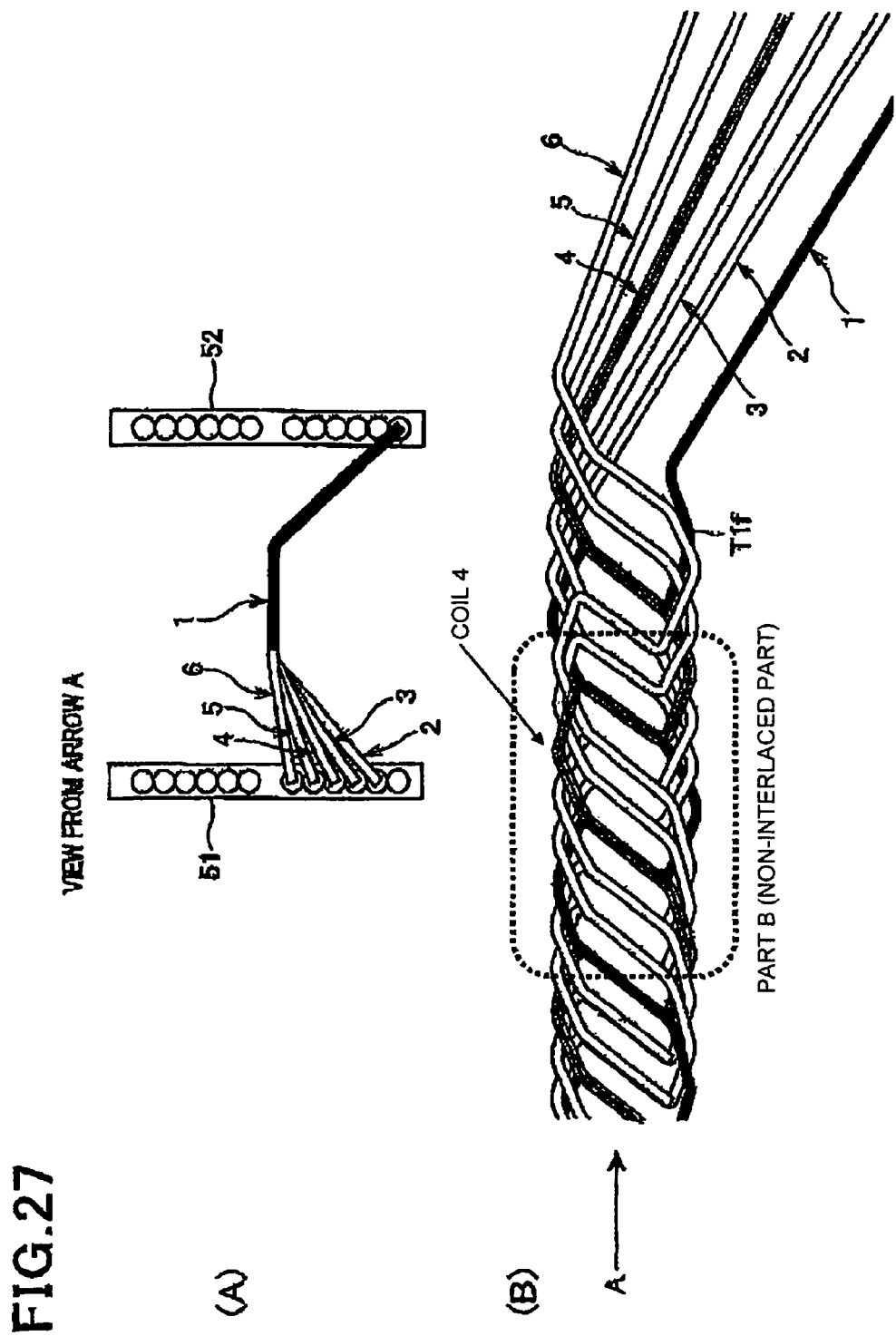

After completion of the first process of the non-interlaced part forming step described above, the second process of the non-interlaced part forming step is performed. At the beginning of the second process, as shown in FIG. 24, the first coil wire 1 is formed with a fifth in-slot portion S1e and a fifth turn portion T1e continuing to the fourth turn portion T1d of the first coil wire 1 by use of the shaping apparatus, and then is held at a predetermined position. At this time, the bobbin of the first coil wire 1 is moved to the first bottom position of the bobbin holder 51 and held there.

Subsequently, as shown in FIG. 25, the second coil wire 2 is formed with a fifth in-slot portion S2e and a fifth turn portion T2e continuing to the fourth turn portion T2d of the second coil wire 2 by use of the shaping apparatus. Subsequently, the fifth turn portion T2e of the second coil wire 2 is moved by a distance equal to the spacing between the adjacent slots in the longitudinal direction, so that it overlaps with one lateral side (the near side of FIG. 25) of the fifth turn portion T1e of the first coil wire 1. At this time, the bobbin of the second coil wire 2 is moved to the second bottom position of the bobbin holder 51 and held there.

Thereafter, as shown in FIG. 26, the third to sixth coil wires 3 to 6 are subjected to the above process like the second coil wire 2. As a result, fifth turn portions T3e, T4e, T5e and The of the third to sixth coil wires 3 to 6 are formed to successively overlap inwardly (in the opposite direction to arrow A of FIG. 26B) with one lateral side of the fifth turn portion T2e of the second coil wire 2 in the state of being successively shifted by a distance equal to the spacing between the adjacent slots in the longitudinal direction. At this time, the bobbins of the third to sixth coil wires 3 to 6 are moved respectively to the third to sixth top positions of the bobbin holder 52 and held there.

Figure 29:
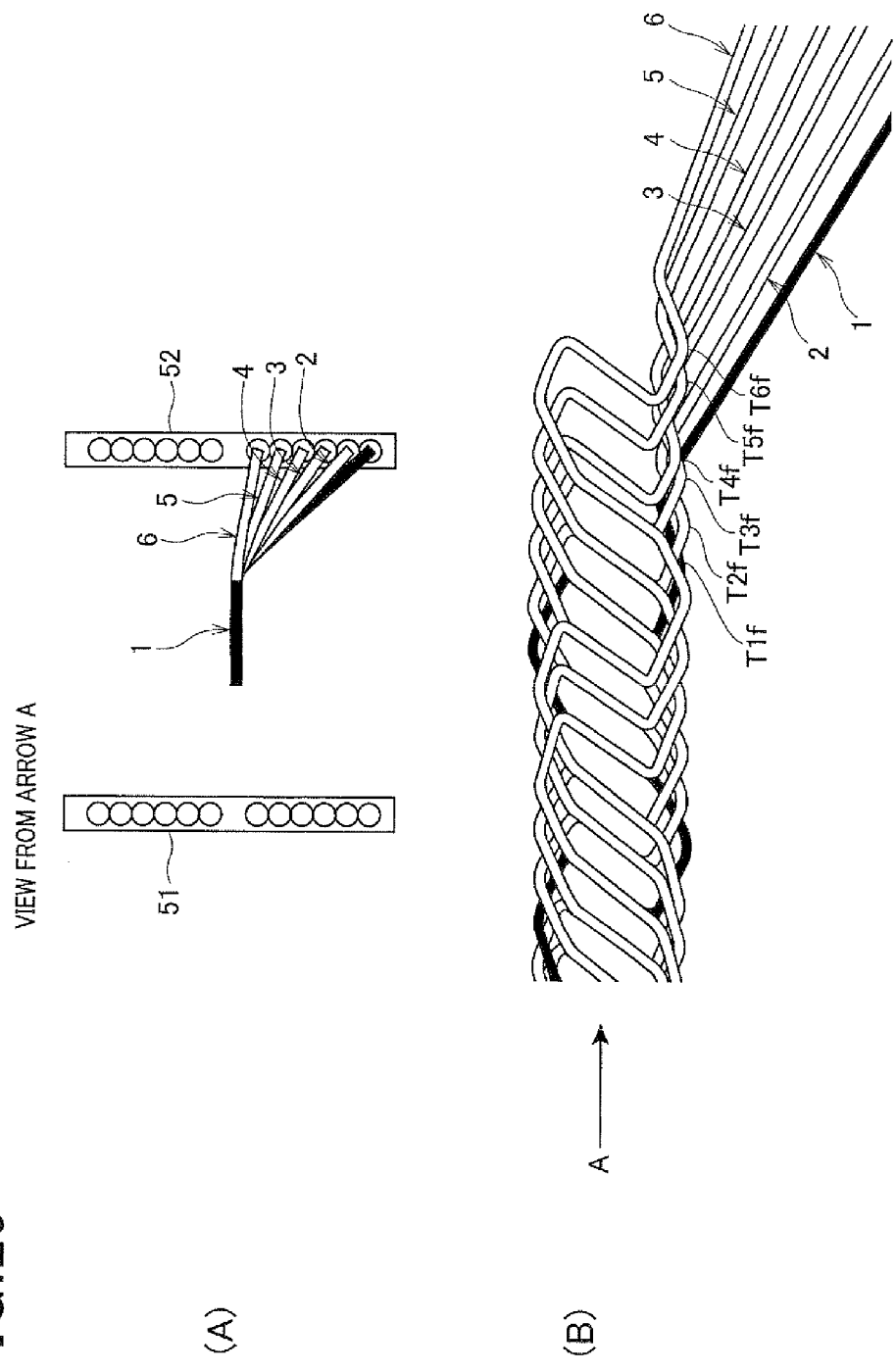
Figure 31:
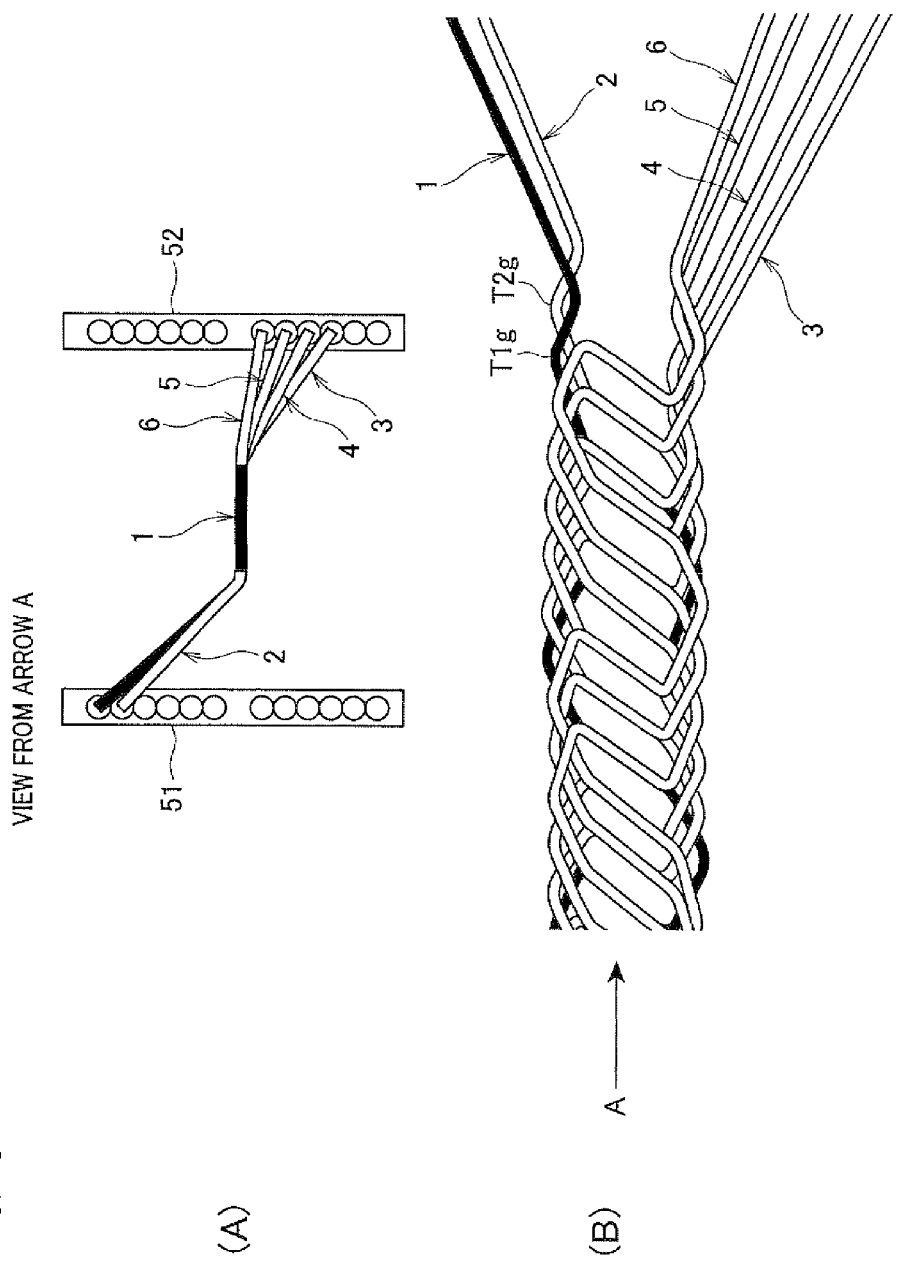
Figure 34:
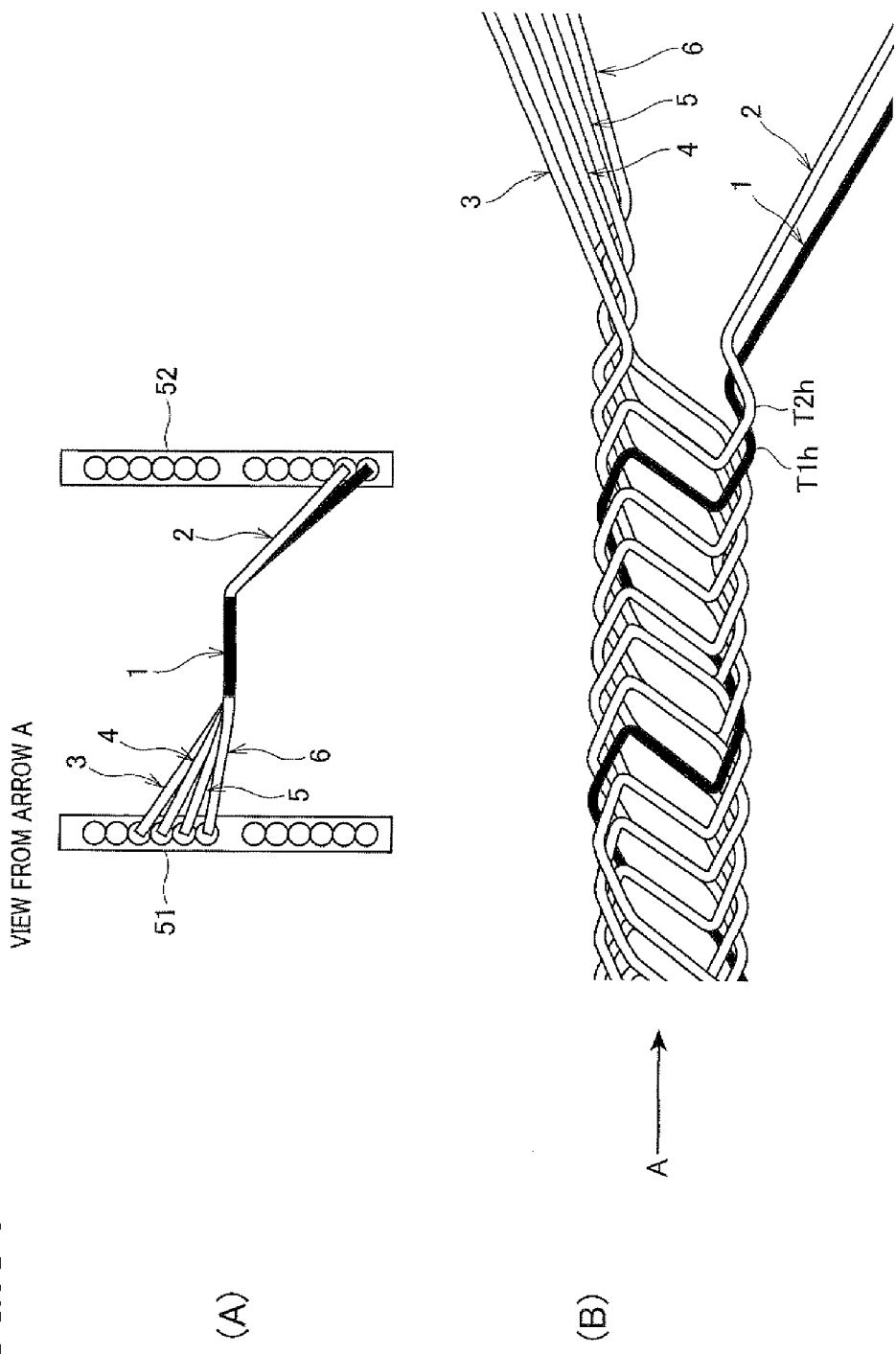

After completion of the second process of the non-interlaced part forming step described above, as shown in FIGS. 27 to 29, the first to sixth coil wires 1 to 6 are subjected to the first process of the non-interlaced part forming step again. As a result, as shown in FIG. 29, sixth turn portions T2f, T3f, T4f, T5f and T6f of the second to sixth coil wires 2 to 6 are formed to successively overlap inwardly (toward the near side of FIGS. 27 to 29) with one lateral side of a sixth turn portion T1f formed in the first coil wire 1 in the state of being successively shifted by a distance equal to the spacing between the adjacent slots in the longitudinal direction. At this time, the bobbins of the second to sixth coil wires 2 to 6 are moved respectively to the second to sixth bottom positions of the bobbin holder 52 and held there.

The first and second processes of the non-interlaced part forming step are performed repeatedly by the number of times determined depending on the length of the non-interlaced part to be formed, or the number of the turn portions to be formed in each of the first to sixth coil wires 1 to 6. As a result, there is obtained a non-interlaced part in which adjacent coil wires are overlapped by the number of times depending on the number of times that the first and second processes have been performed with adjacent coil wires not intersecting with each other. Since the second process and the first process performed after the first process is performed for the second time, are the same as above, their explanations are omitted.

After completion of the first-time non-interlaced part forming step, the interlaced part forming step is carried out for the second time. By performing the first process of the second-time interlaced part forming step, as shown in FIG. 32, seventh turn portions T2g, T3g, T4g, T5g and T6g of the second to sixth coil wires 2 to 6 are formed to successively intersect and overlap outwardly (toward the far side of FIGS. 30 to 32) with one lateral side of a seventh turn portion T1g formed in the first coil wire 1 in the state of being successively shifted by a distance equal to the spacing between the adjacent slots in the longitudinal direction. At this time, the bobbins of the second to sixth coil wires 2 to 6 are moved respectively to the second to sixth top positions of the bobbin holder 51 and held there.

After completion of the first process of the second-time interlaced part forming step, the second process of the second-time interlaced part forming step is performed. As a result, as shown in FIG. 35, eighth turn portions T2h, T3h, T4h, T5h and T6h of the second to sixth coil wires 2 to 6 are formed to successively intersect and overlap toward outwardly (toward the near side of FIGS. 33 to 35) with the other lateral side of an eighth turn portion T1h formed in the first coil wire 1 in the state of being successively shifted by a distance equal to the spacing between the adjacent slots in the longitudinal direction. At this time, the bobbins of the first to sixth coil wires 1 to 6 are moved respectively to the first to sixth bottom positions of the bobbin holder 52 and held there.

The first and second processes of the second-time interlaced part forming step are performed by the same number of times as the first and the second processes of the first-time interlaced part forming step were performed. As a result, there is obtained an interlaced part in which the coil wires are overlapped in the state of adjacent coil wires intersecting with each other by the number of times depending on the number of times that the first and second processes have been performed. Since the number of times that the first and second processes are performed in the second-time interlaced part forming step is the same as the number of times that the first and second processes are performed in the first-time interlaced part forming step, the number of the turn portions included in the interlaced part obtained by the second-time interlaced part forming step is the same as that included in the interlaced part obtained by the first-time interlaced part forming step.

After completion of the second-time interlaced part forming step, the non-interlaced part forming step is performed for the second time to perform the first and second processes by the same number of times that they were performed during the first non-interlaced part forming step. As a result, there is obtained a non-interlaced part including the same number of the turn positions included in the non-interlaced part obtained by the first-time non-interlaced part forming step.

Thereafter, the interlaced part forming step and the non-interlaced part forming step are carried out in an alternating sequence to form the band-like coil wire combination 50 in which the interlaced parts and the non-interlaced parts are disposed alternately as shown in FIG. 10. The band-like coil wire combination 50 shown in FIG. 10 is constituted of twelve coil wires 30 formed such that the interlaced parts and the non-interlaced parts alternate from one end side (from the left side of FIG. 10) to the other end side. In this embodiment, the interlaced part in which the coil wires 30 are overlapped with adjacent coil wires 30 intersecting with each other are formed at five locations, and the non-interlaced part in which the coil wires 30 are overlapped with adjacent coil wires 30 not intersecting with each other are formed at four locations.

After completion of the coil wire combination body forming step including the interlaced part forming step and the non-interlaced part forming step, the shaping step of shaping the coil wire combination 50 into a cylindrical shape by winding the coil wire combination body 50 helically in the direction from one side the other side is carried out. In more detail, the coil wire combination 50 is wound by four turns such that the four non-interlaced parts are located at four loop transition portions, respectively. This makes it possible to make the step space at each of the loop transition portions smaller to thereby prevent reduction of the lamination factor at the loop transition portions. Finally, the ends of the coil wires are subjected to a connecting process as necessary to complete the coil assembly 20 shown in FIGS. 5 and 6.

According to the coil assembly manufacturing method of this embodiment including the coil wire combination forming step in which the interlaced part forming step and the non-interlaced part forming step are performed alternately, and the shaping step of shaping the coil wire combination into a cylindrical shape by helically winding the coil wire combination, it is possible to manufacture the coil assembly 20 in which the non-interlaced parts are located at the loop transition portions, respectively.

Accordingly, according to this embodiment, it is possible to provide a coil assembly in which the step space at each of its loop transition portions is small enough to prevent reduction of the lamination factor at the loop transition portions. In addition, since the coil wires 30 may have a rectangular cross section, the lamination factor can be further increased. Furthermore, since the coil wire combination 50 wound by a plurality of turns to have a helical shape can be formed from the contiguous coil wires 30, the number of wire connections can be reduced.

According to the method of this embodiment, since the interlaced part forming step and the non-interlaced part forming step are performed in an alternating sequence, it is possible to form the coil wire combination 50 having the structure in which the interlaced parts and the non-interlaced parts are located alternately along its longitudinal direction.

Also, according to the method of this embodiment, since the interlaced parts are formed to include the same number of the turn portions, when the coil wire combination 50 is helically wound to have a cylindrical shape, all the interlaced parts can be located in the same circumferential position range. This makes it possible to shape the coil wire combination 50 into a desired cylindrical shape with ease. Further, since the non-interlaced parts are also formed to include the same number of the turn portions, this also makes it possible to shape the coil wire combination 50 into a desired cylindrical shape with ease.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a coil assembly for a stator formed with slots comprising:
   a coil wire combination forming step of forming a band-like coil wire combination by overlapping a plurality of coil wires in a predetermined state while forming said plurality of said coil wires with in-slot portions to be accommodated in said slots and turn portions each connecting each adjacent two of said in-slot portions and wherein said turn portions are formed in a staircase profile shape; and
   a shaping step of shaping said band-like coil wire combination into a cylindrical shape by spirally winding said band-like coil wire combination;
   wherein said coil wire combination forming step is carried out by performing an interlaced part forming step of forming an interlaced part by overlapping said coil wires such that each adjacent two of said coil wires intersect with each other and interlace with each other and a non-interlaced part forming step of forming a non-interlaced part by overlapping said coil wires such that each adjacent two of said coil wires intersect with each other and do not interlace with each other.

2. The method according to claim 1, wherein said interlaced part forming step and said non-interlaced part forming step are performed in an alternating sequence.

3. The method according to claim 1, wherein said interlaced part is formed plurally such that the formed interlaced parts have the same number of said turn portions.

4. The method according to claim 1, wherein said non-interlaced part is formed plurally such that the formed non-interlaced parts have the same number of said turn portions.

5. The method according to claim 1, wherein said interlaced part forming step includes:
   a first process to successively overlap outwardly, to a first turn portion of a first one of said coil wires on one lateral side thereof having been formed with said first in-slot portion and a first turn portion, first in-slot portions of a second one and remaining ones of said coil wires each having been formed with said first in-slot portion thereof and a first turn portion thereof while being successively shifted by a predetermined distance in a longitudinal direction of said band-like coil wire combination; and a second process to successively overlap outwardly, to a second turn portion of said first one of said coil wires on the other lateral side thereof having been formed with said second in-slot portion and a second turn portion, second in-slot portions of said second one and remaining ones of said coil wires each having been formed with said second in-slot portion thereof and a second turn portion thereof in a state of interlacing said second turn portion of said first coil wire and being successively shifted by a predetermined distance in said longitudinal direction of said band-like coil wire combination.

6. The method according to claim 1, wherein said non-interlaced part forming step includes:

a first process to successively overlap inwardly, to a first turn portion of a first one of said coil wires on one lateral side thereof having been formed with said first in-slot portion and a first turn portion, first in-slot portions of a second one and remaining ones of said coil wires each having been formed with said first in-slot portion thereof and a first turn portion thereof while being successively shifted by a predetermined distance in a longitudinal direction of said band-like coil wire combination; and a second process to successively overlap inwardly, to a second turn portion of said first one of said coil wires on the other lateral side thereof having been formed with said second in-slot portion and a second turn portion, second in-slot portions of said second one and remaining ones of said coil wires each having been formed with said second in-slot portion thereof and a second turn portion thereof in a state of being successively shifted by a predetermined distance in said longitudinal direction of said band-like coil wire combination.

7. The method according to claim 1, wherein each of said coil wires is constituted of a conductor having a rectangular cross section, and an insulating film covering an outer surface of said conductor.

* * * * *